(12) United States Patent
Hao et al.

(10) Patent No.: US 11,201,321 B1
(45) Date of Patent: Dec. 14, 2021

(54) LIMMOXFY SHELL FORMATION ON CATHODE CERAMIC PARTICLE FOR LI ION BATTERY THROUGH ONIUM METAL OXIDE FLUORIDE PRECURSOR

(71) Applicant: SACHEM, INC., Austin, TX (US)

(72) Inventors: Jianjun Hao, Austin, TX (US); James C. Knight, Austin, TX (US)

(73) Assignee: SACHEM, INC., Austin, TX (US)

( * ) Notice: Subject to any disclaimer, the term of this patent is extended or adjusted under 35 U.S.C. 154(b) by 66 days.

(21) Appl. No.: 16/768,914

(22) PCT Filed: Dec. 12, 2018

(86) PCT No.: PCT/US2018/065099
§ 371 (c)(1),
(2) Date: Jun. 2, 2020

(87) PCT Pub. No.: WO2019/133251
PCT Pub. Date: Jul. 4, 2019

Related U.S. Application Data

(60) Provisional application No. 62/611,705, filed on Dec. 29, 2017.

(51) Int. Cl.
*H01M 4/13915* (2010.01)
*H01M 4/58* (2010.01)
(Continued)

(52) U.S. Cl.
CPC ........ *H01M 4/13915* (2013.01); *C01G 51/42* (2013.01); *C01G 53/42* (2013.01);
(Continued)

(58) Field of Classification Search
CPC .................. H01M 4/13915; H01M 4/1315
See application file for complete search history.

(56) References Cited

U.S. PATENT DOCUMENTS

2015/0380727 A1 12/2015 Hao et al.
2016/0329563 A1 11/2016 Oh et al.

FOREIGN PATENT DOCUMENTS

KR 20140129807 A 11/2014

OTHER PUBLICATIONS

PCT/US2018/065099; PCT International Search Report and Written Opinion of the International Searching Authority dated Mar. 8, 2019.

*Primary Examiner* — Peter F Godenschwager
(74) *Attorney, Agent, or Firm* — Renner, Otto, Boisselle & Sklar, LLP

(57) ABSTRACT

Disclosed is a process for coating onto a substrate, including preparing a precursor having a general formula $Q_{m/n}MO_xF_y$ by a reaction $M(OH)_x + yHF + m/nQ(OH)_n \rightarrow Q^{n+}_{m/n}(MO_xF_y)^{m-}$, wherein Q is an onium ion, selected from quaternary alkyl ammonium, quaternary alkyl phosphonium and trialkylsulfonium; M is a metal capable of forming an oxofluorometallate, where M may further comprise one or more additional metal, metalloid, and one or more of phosphorus (P), sulfur (S) and selenium (Se), iodine (I), and arsenic (As) or a combination thereof, and x>0, y>0, m≥1, n≥1; combining the precursor with a lithium ion source and with the substrate, and mixing to form a coating composition comprising a lithium oxofluorometallate having a general formula $Li_mMO_xF_y$ on the substrate. Further disclosed is a core-shell electrode active material including a core capable of intercalating and deintercalating lithium coated with the lithium oxofluorometallate having the general formula $Li_mMO_xF_y$.

12 Claims, 19 Drawing Sheets

TOF-SIMS data from various coating samples

(51) Int. Cl.
*H01M 4/525* (2010.01)
*H01M 4/505* (2010.01)
*H01M 4/1315* (2010.01)
*C01G 51/00* (2006.01)
*C01G 53/00* (2006.01)
*H01M 4/36* (2006.01)
*H01M 4/02* (2006.01)
*H01M 10/0525* (2010.01)

(52) U.S. Cl.
CPC .......... *C01G 53/50* (2013.01); *H01M 4/1315* (2013.01); *H01M 4/366* (2013.01); *H01M 4/505* (2013.01); *H01M 4/525* (2013.01); *H01M 4/582* (2013.01); *C01P 2002/52* (2013.01); *C01P 2002/89* (2013.01); *C01P 2004/03* (2013.01); *C01P 2004/84* (2013.01); *C01P 2006/40* (2013.01); *H01M 10/0525* (2013.01); *H01M 2004/028* (2013.01)

Fig. 1 TOF-SIMS data from various coating samples
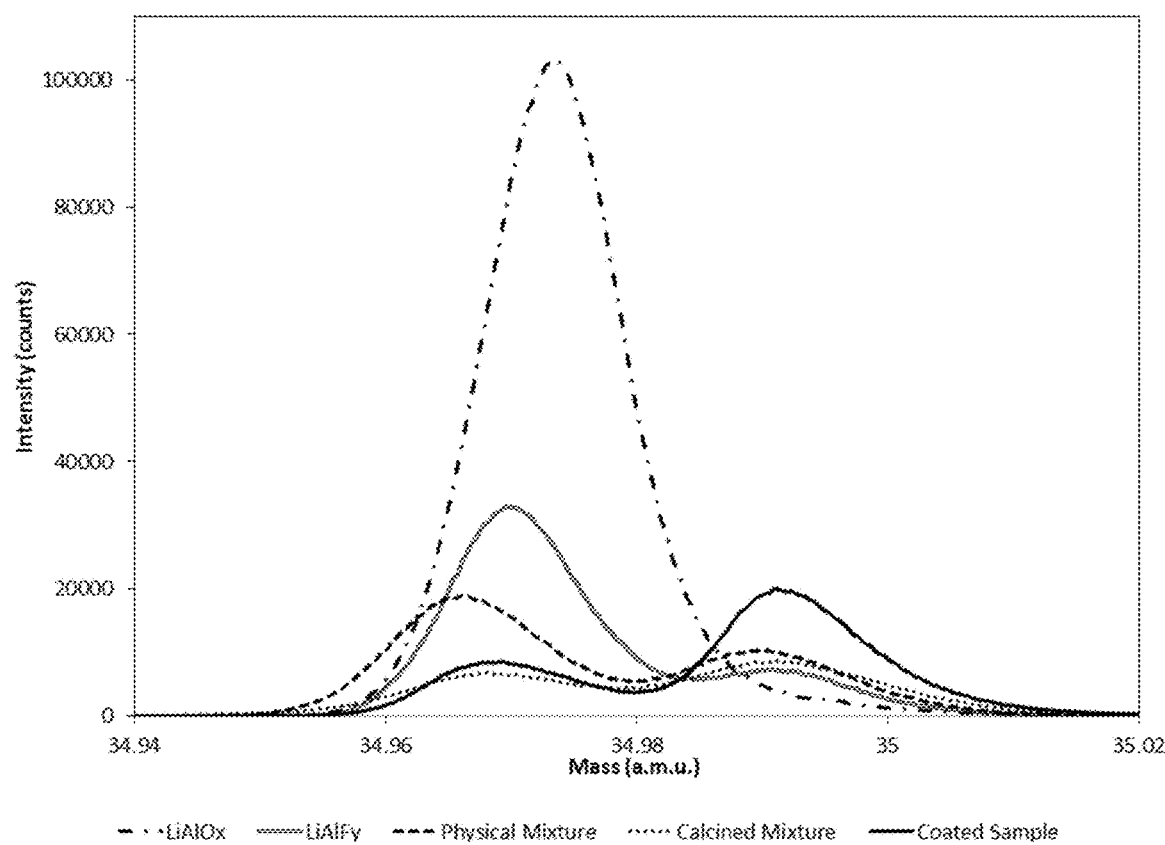

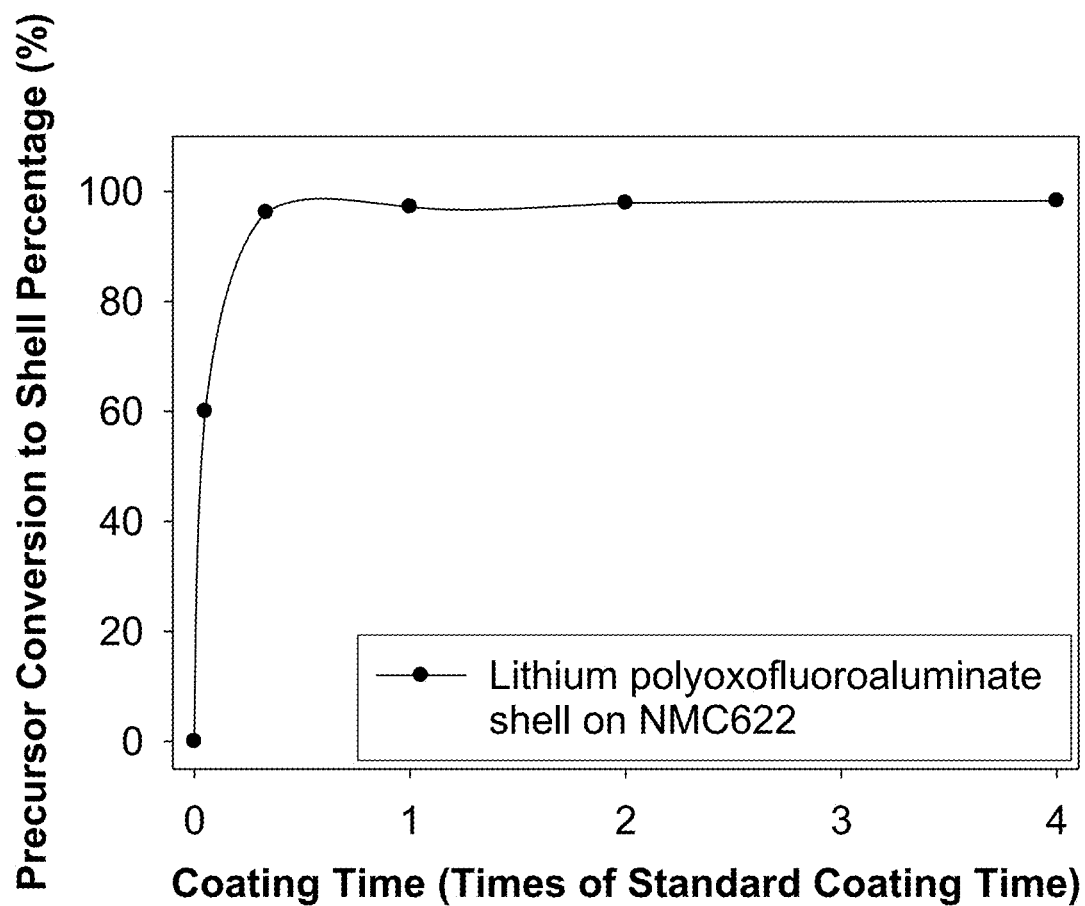
Fig.2 Precursor conversion percentage upon coating process time

Figs.3(a)-3(g)   SEM observation of pristine and coated NMC622 particles by LimAlOxFy shell with different Al-F : Al-O molar ratio
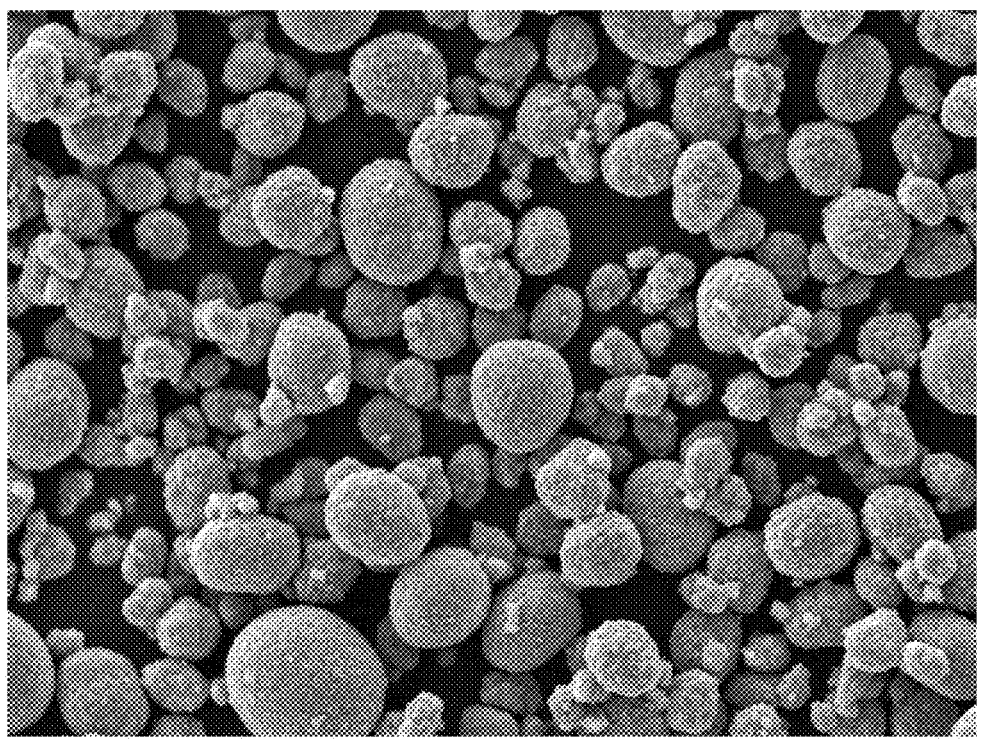
Fig. 3(a)   NMC622 pristine
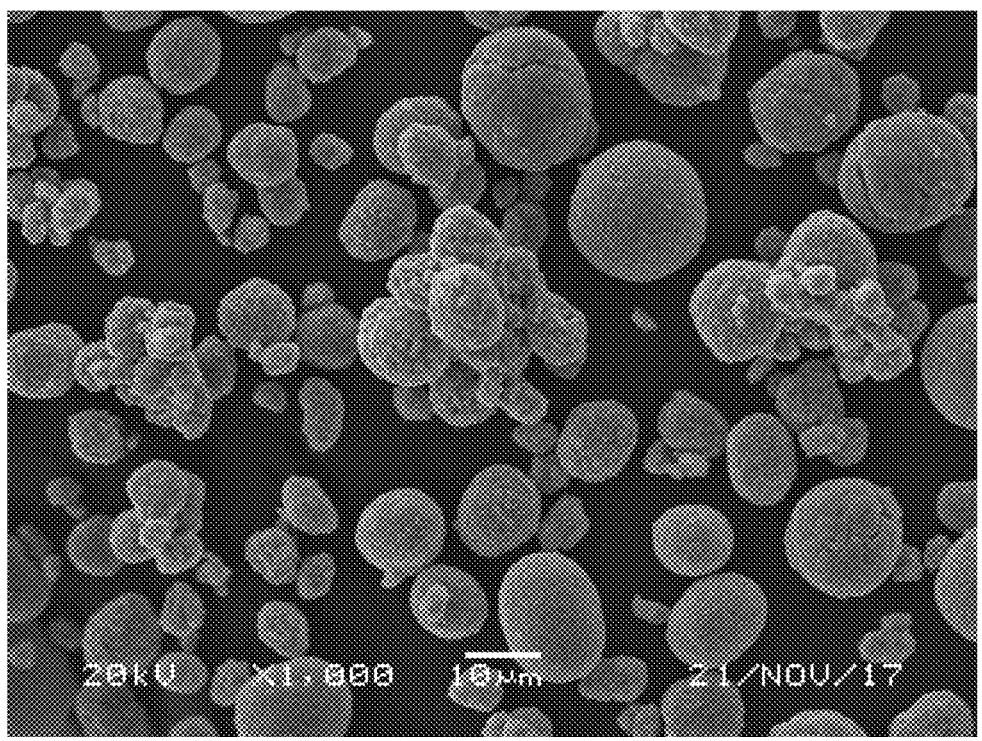
Fig. 3(b)   NMC622 coated by $Li_3AlO_{2.85}F_{0.3}$ (Al-F:Al-O = 5:95 mol/mol)

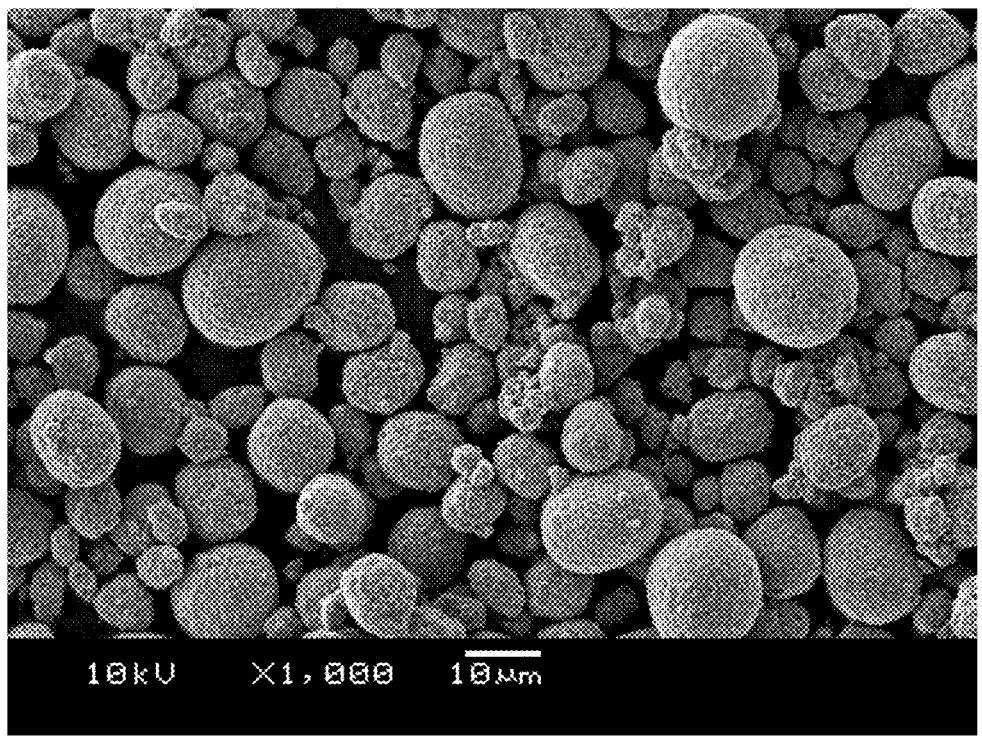
Fig. 3(c)   NMC622 coated by $Li_3AlO_{2.1}F_{1.8}$ (Al-F:Al-O = 30:70 mol/mol)
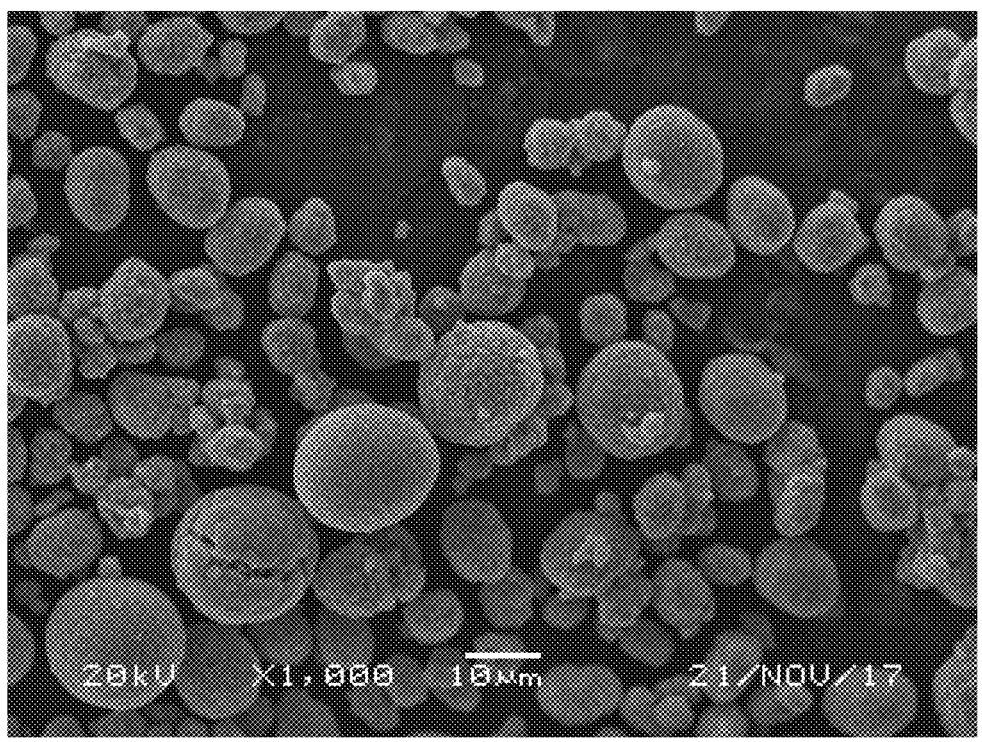
Fig. 3(d)   NMC622 coated by $Li_3AlO_{1.5}F_{3.0}$ (Al-F:Al-O = 50:50 mol/mol)

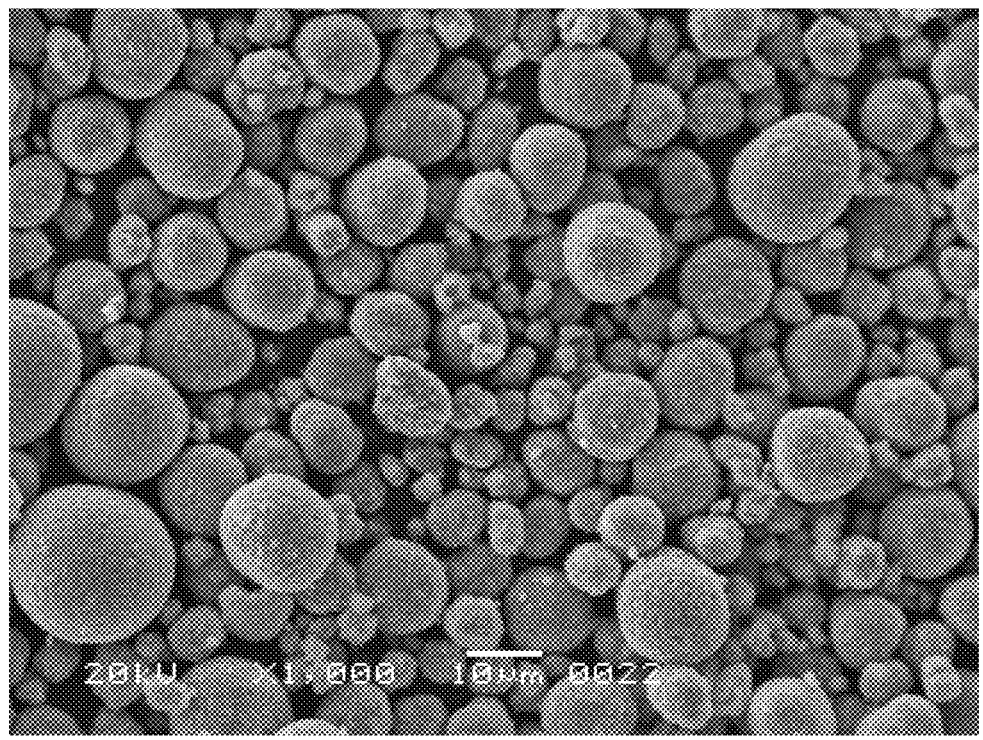
Fig. 3(e) NMC622 coated by $Li_3AlO_{0.9}F_{4.2}$ (Al-F:Al-O = 70:30 mol/mol)
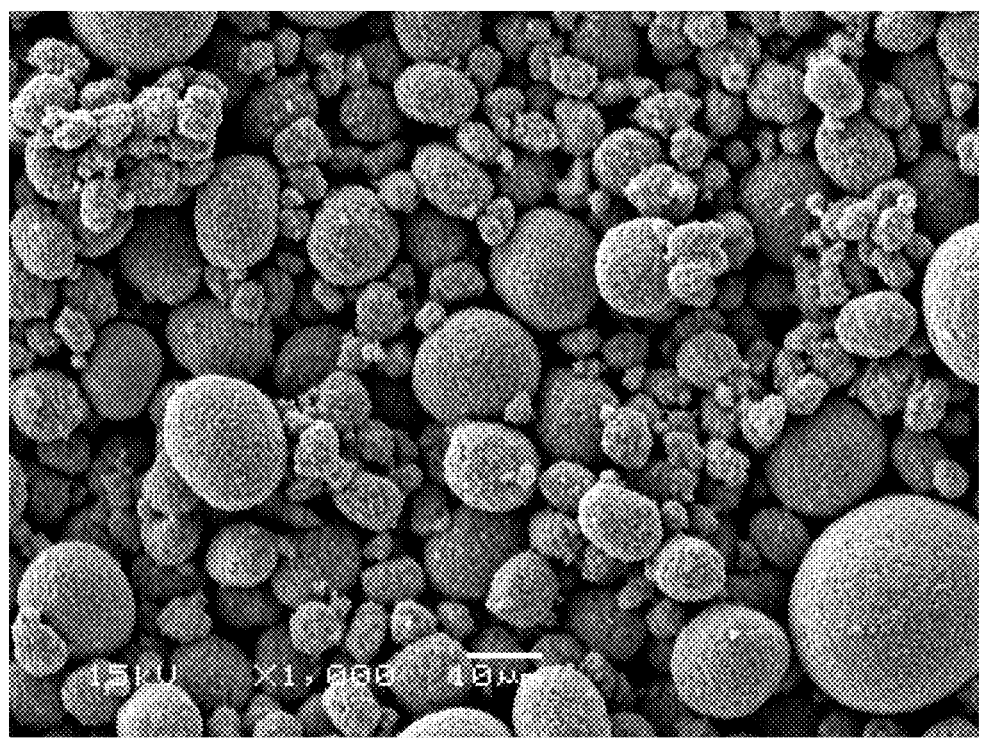
Fig. 3(f) NMC622 coated by $Li_3AlO_{0.45}F_{5.1}$ (Al-F:Al-O = 85:15 mol/mol)

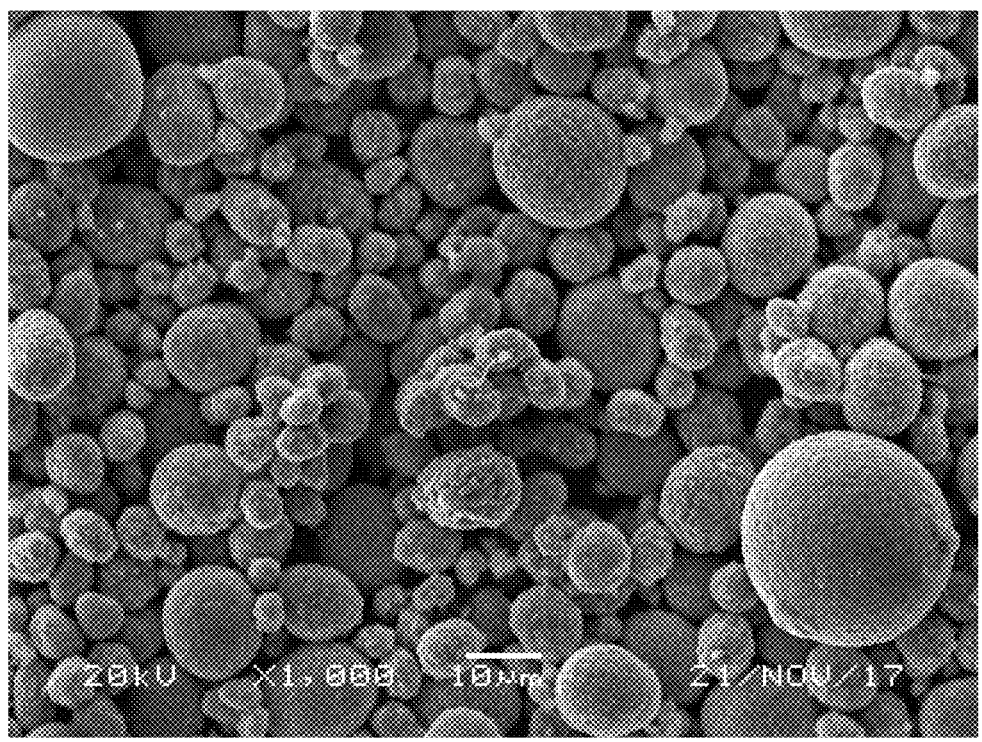
Fig. 3(g)   NMC622 coated by $Li_3AlO_{0.15}F_{5.7}$ (Al-F:Al-O = 95:5 mol/mol)

Figs. 4(a)-4(b) SEM observation of NMC622 (a) pristine, (b) $Li_3AlO_{0.9}F_{4.2}$ (Al-F:Al-O = 70:30 mol/mol) coated
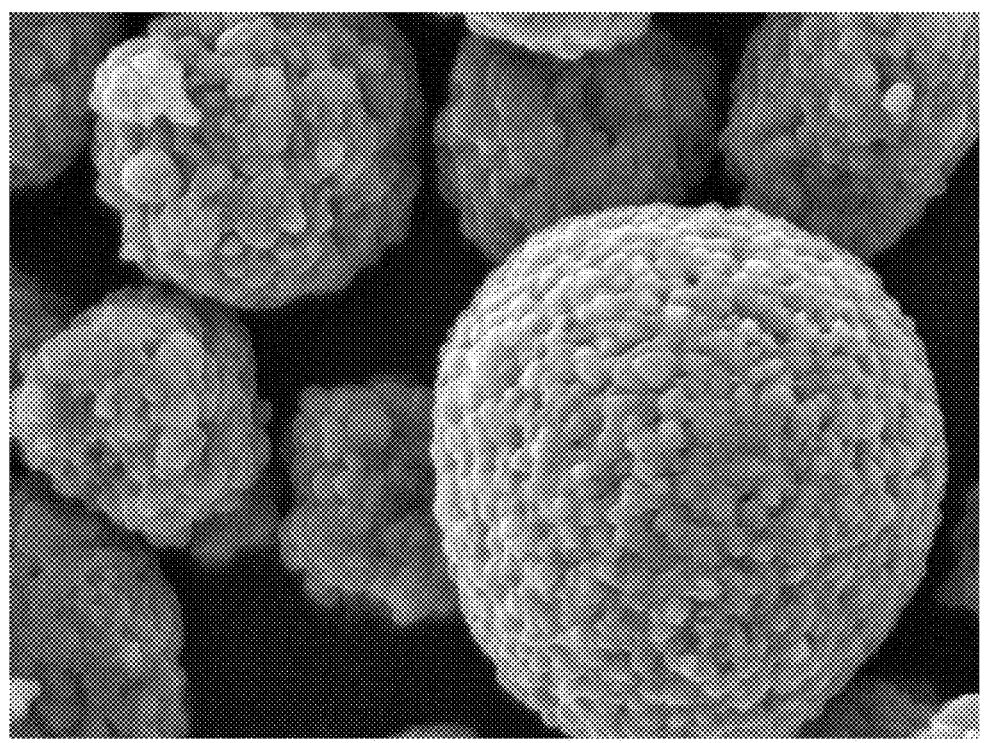
Fig. 4(a) Pristine
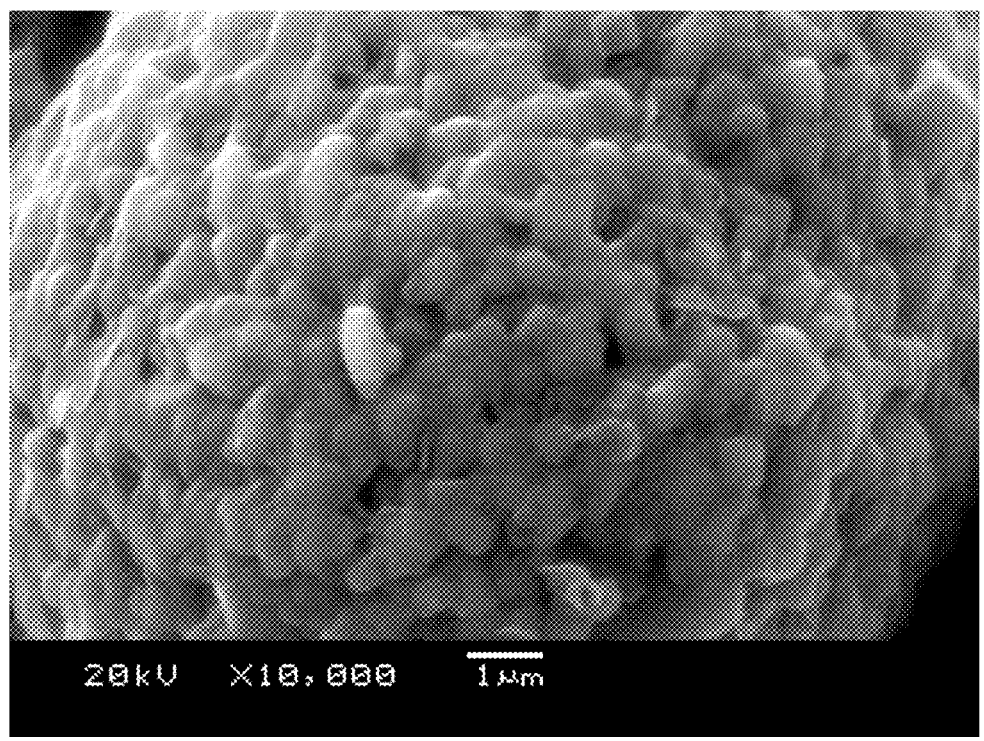
Fig. 4(b) Coated Figs. 5(a)-5(b)   SEM observation of NCA particles (a) pristine, (b) $Li_3AlO_{0.9}F_{4.2}$ (Al-F:Al-O = 70:30 mol/mol) coated NCA particles
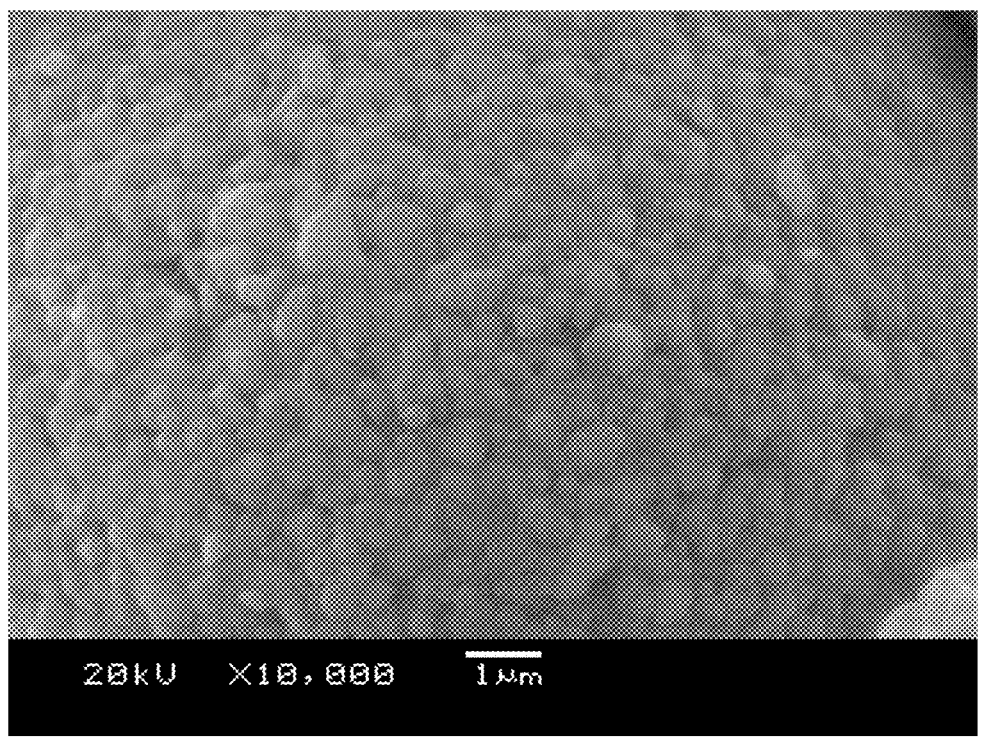
Fig. 5(a)   NCA pristine
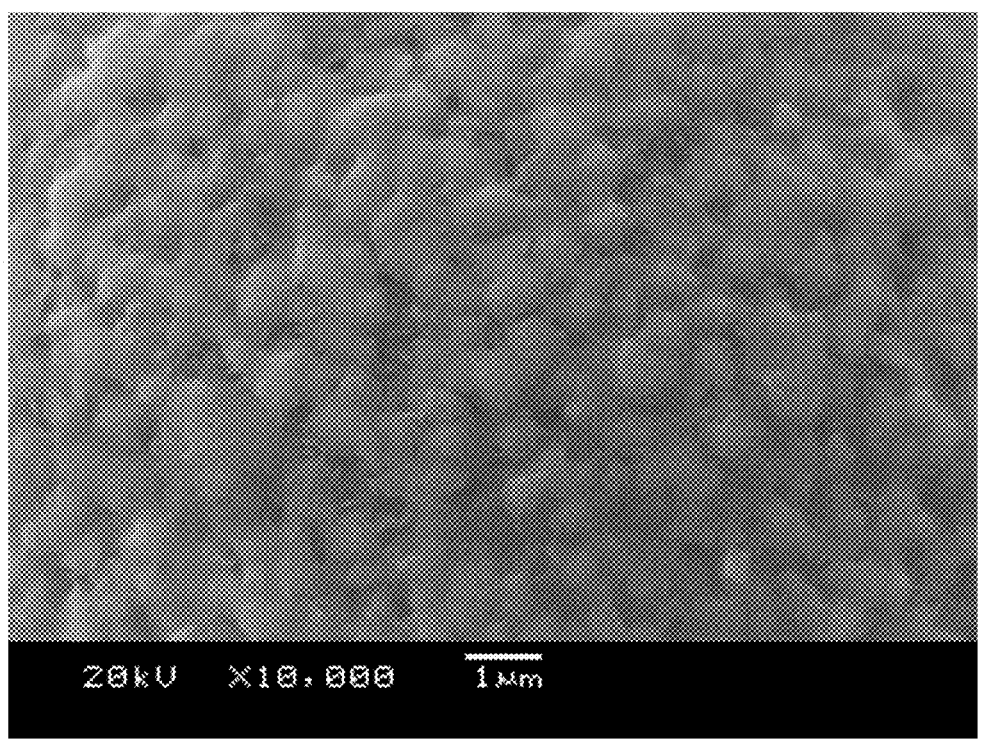
Fig. 5(b)   NCA coated Figs. 6(a)-6(b)　　SEM observation of LCO particles (a) pristine, (b) $Li_3AlO_{0.9}F_{4.2}$ (Al-F:Al-O = 70:30 mol/mol) coated
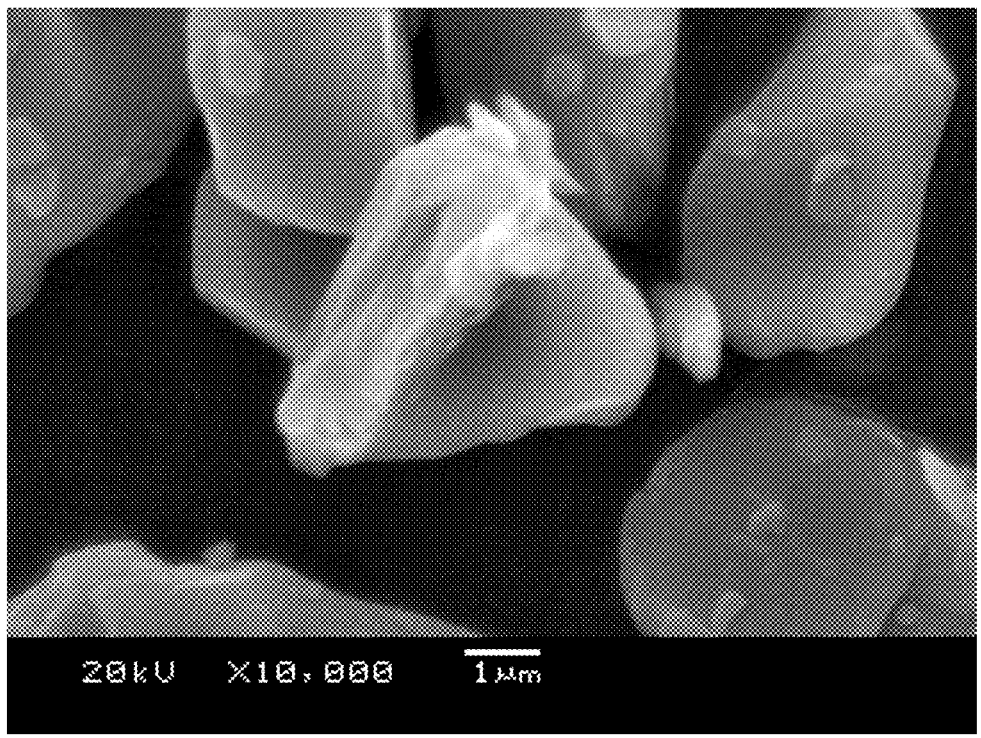
Fig. 6(a)　Pristine
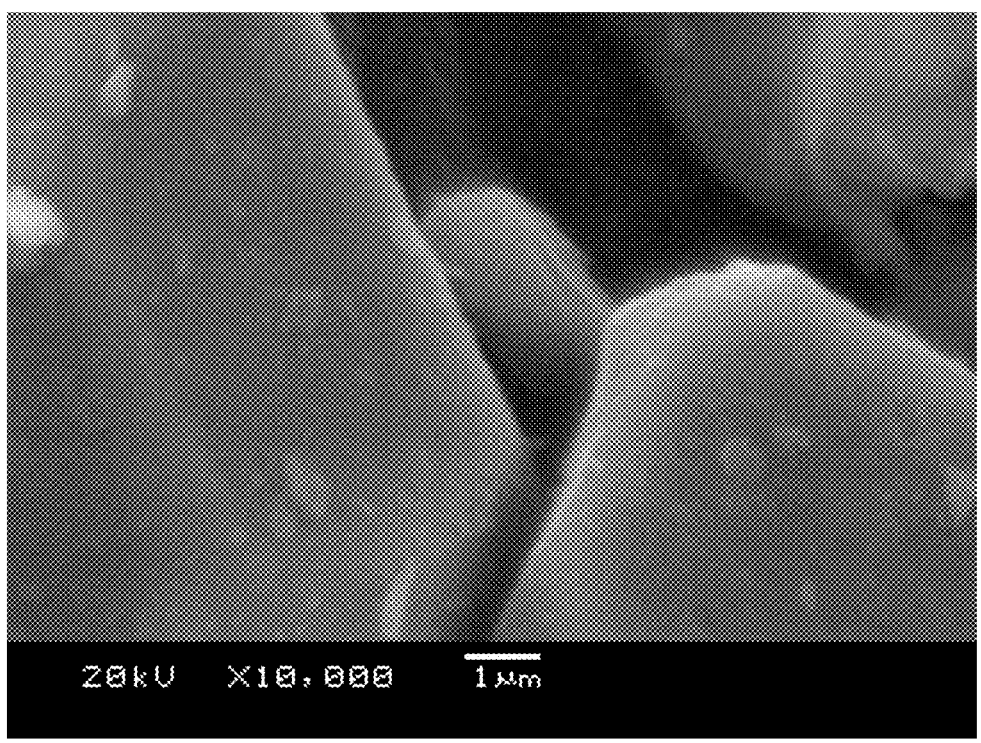
Fig. 6(b)　Coated Figs. 7(a)-7(e)   SEM observation of different coating materials by different coating methods
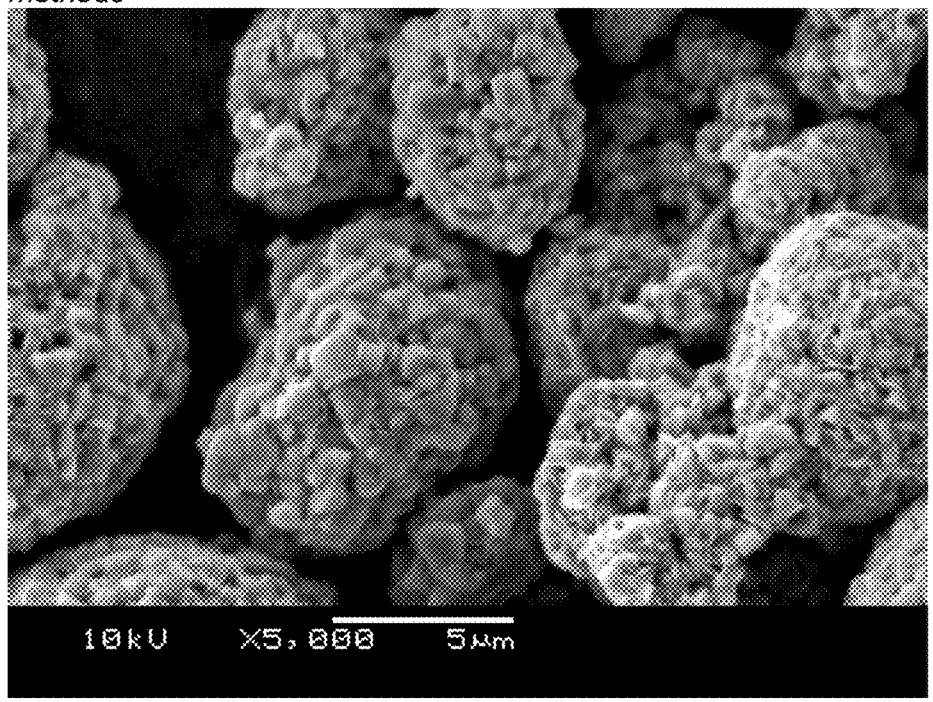
Fig. 7 (a) Aqueous solution coating of $Li_3AlO_{2.1}F_{1.8}$ (Al-F:Al-O = 30:70 mol/mol) on NMC622 core particles
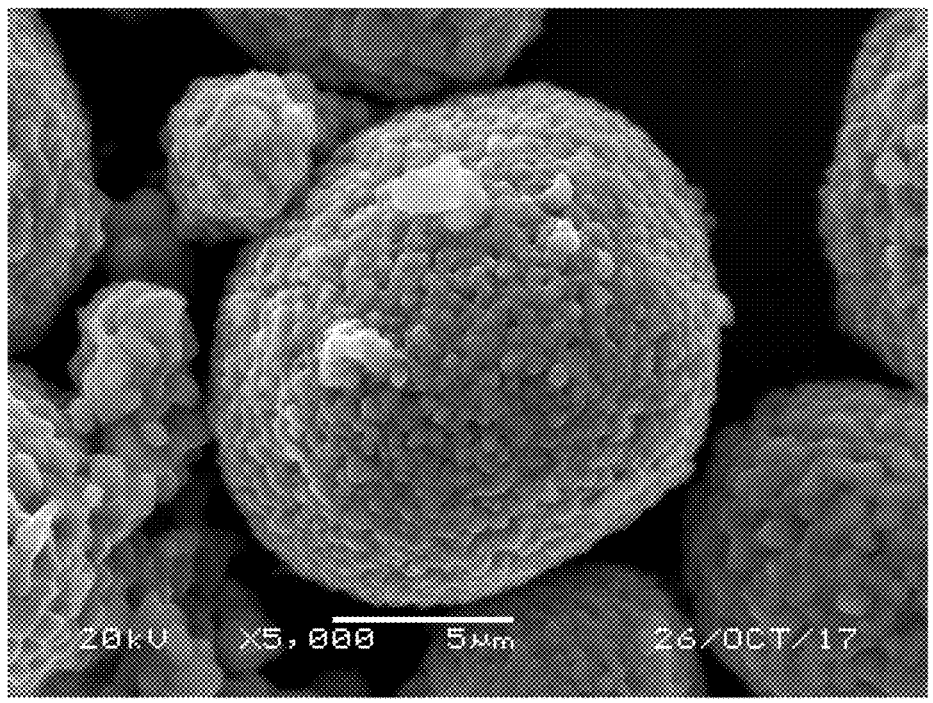
Fig. 7(b)   Aqueous solution coating of $Li_2Ti0.93Zr0.07O2.79F0.42$ on NMC622 core particles

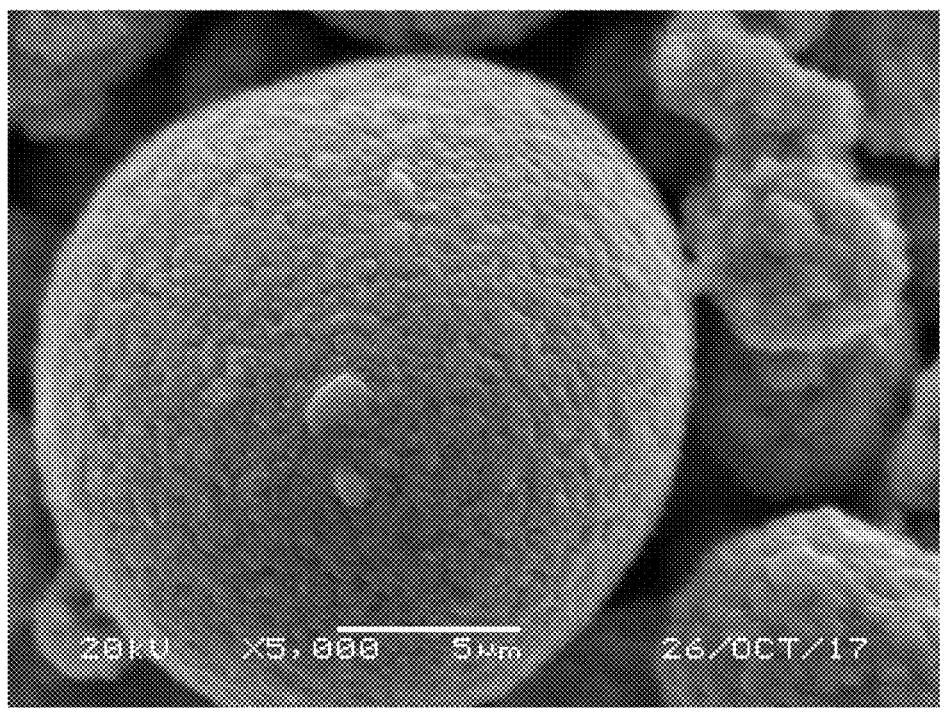
Fig. 7(c) Solvent solution coating of $Li_3AlO_{0.9}F_{4.2}$ (Al-F:Al-O = 70:30 mol/mol) on NMC622 core particles
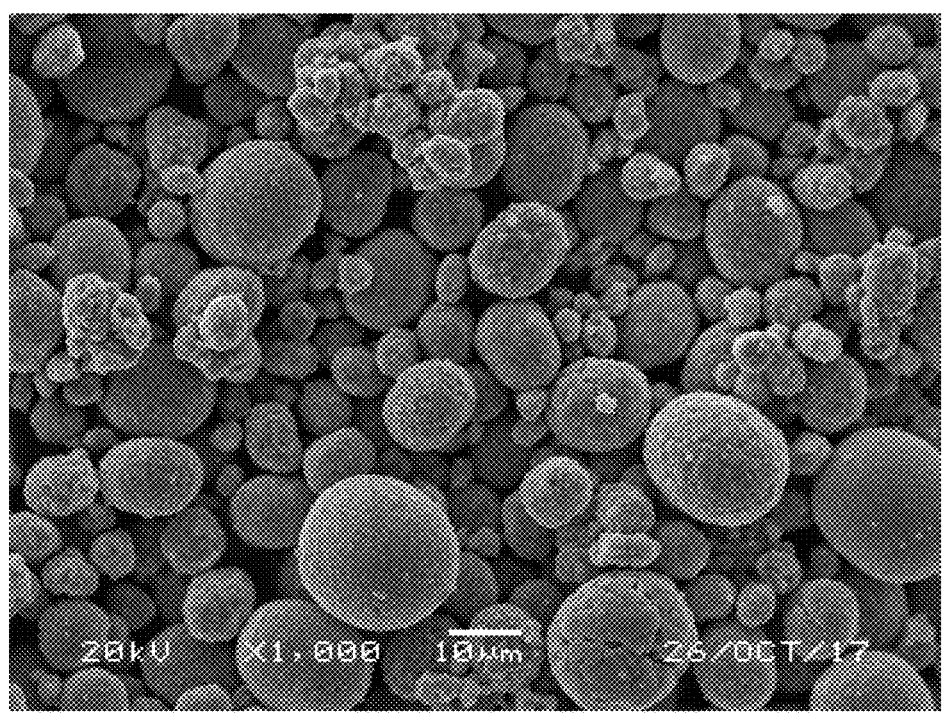
Fig. 7(d) Solid blending coating of $Li_3AlO1.5F3$ (Al-F:Al-O = 50:50 mol/mol) on NMC622 core particles

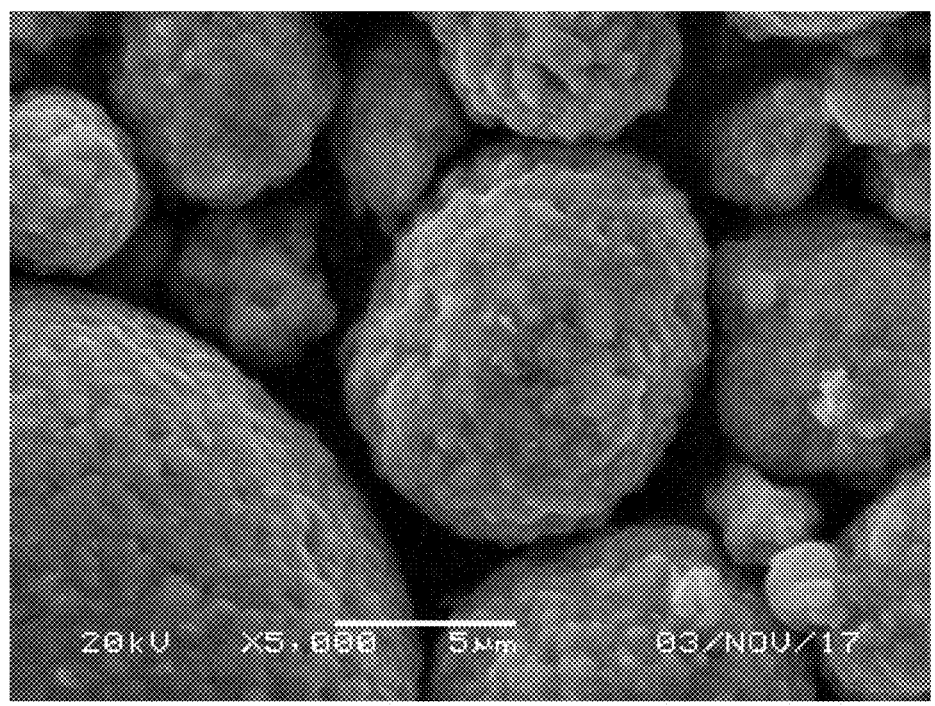
Fig. 7(e) Sol-gel coating of $Li_{1.92}Ti_{0.47}Al_{0.16}Zr_{0.13}Si_{0.24}O_{2.49}F_{0.78}$ on NMC622 core particles

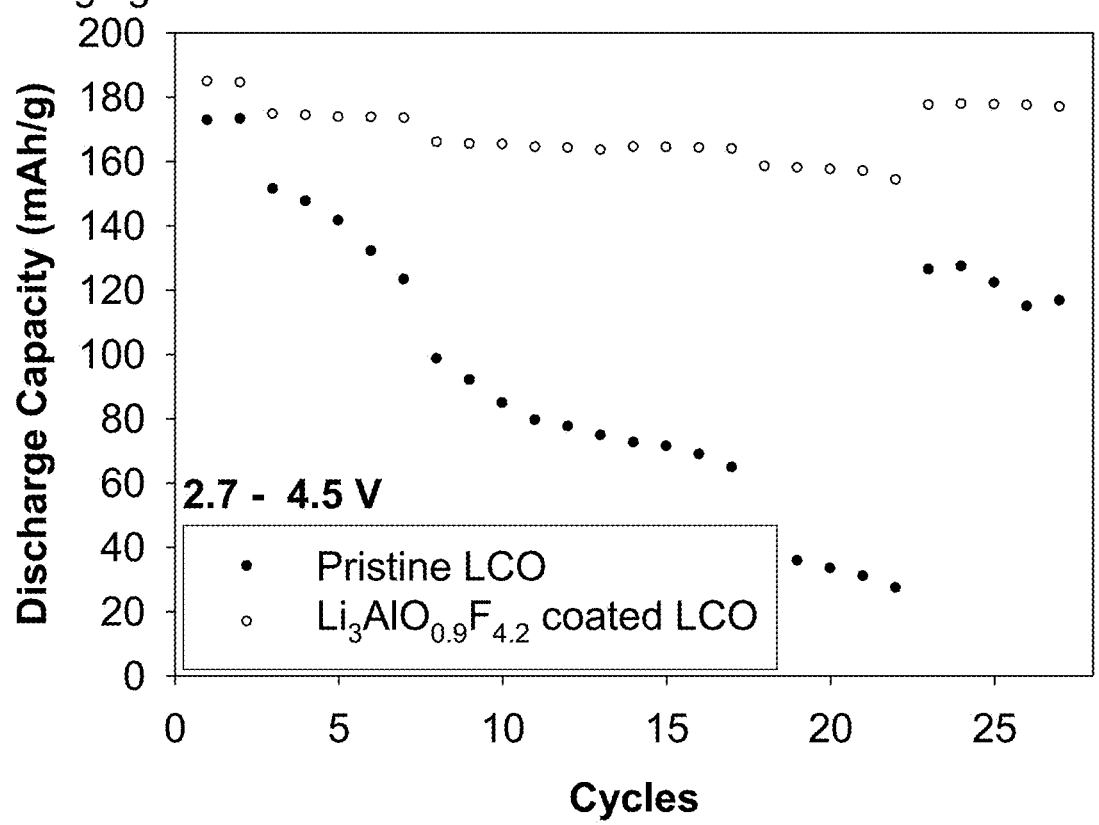
Fig. 8 Battery cycling test result for LCO material with $Li_3AlO_{0.9}F_{4.2}$ shell (Al-F:Al-O = 70:30 mol/mol)

Fig. 9 Battery cycling test result for LCO cathode material coated by $Li_3Al_{0.3}In_{0.7}O_{0.9}F_{4.2}$ shell
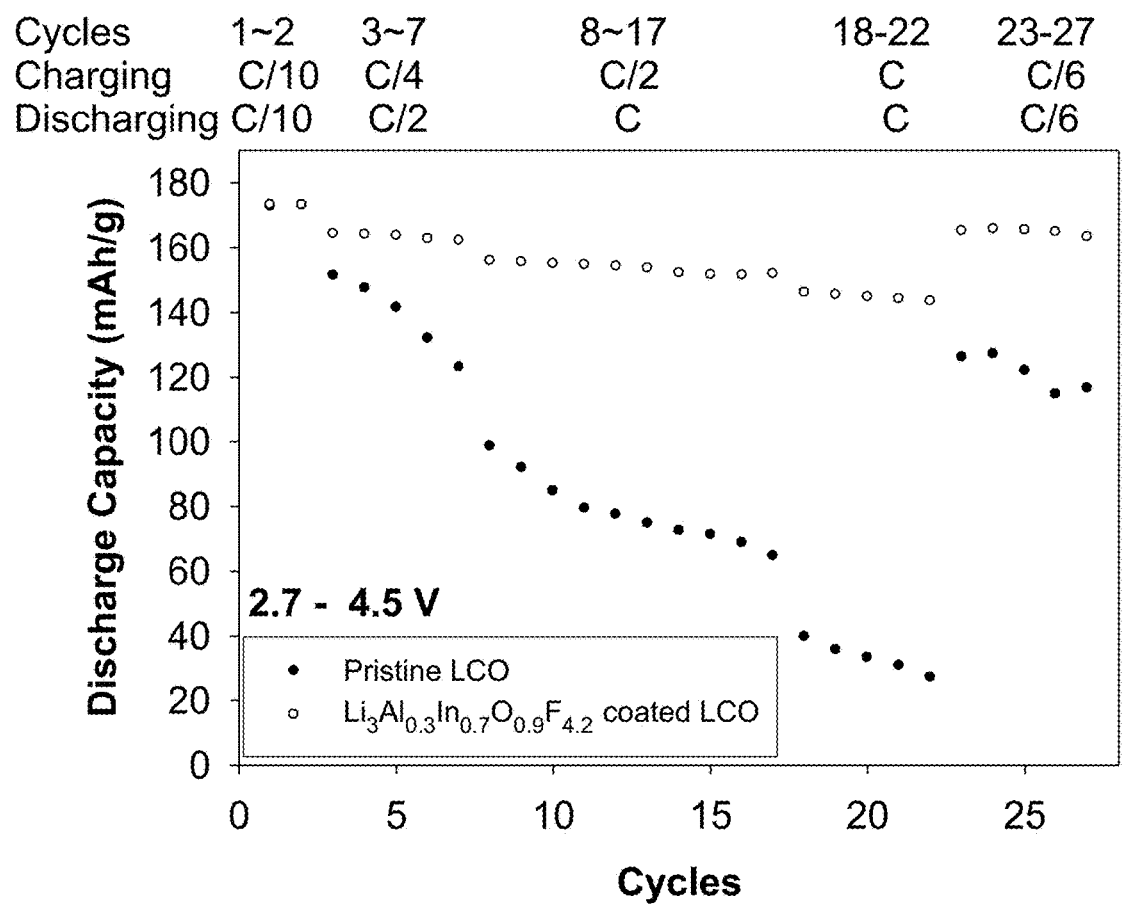

Fig. 10 Battery cycling test result for LiNi$_{0.6}$Mn$_{0.2}$Co$_{0.2}$O$_2$ cathode material coated by Li$_3$AlO$_{0.9}$F$_{4.2}$ shell (Al-F:Al-O = 70:30 mol/mol)
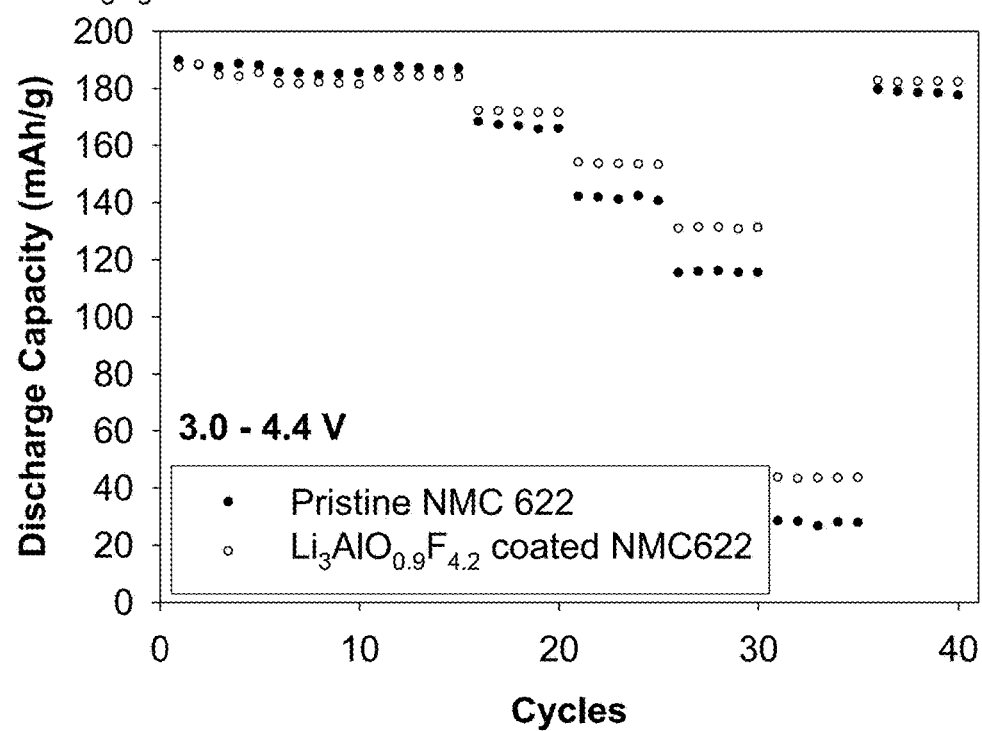

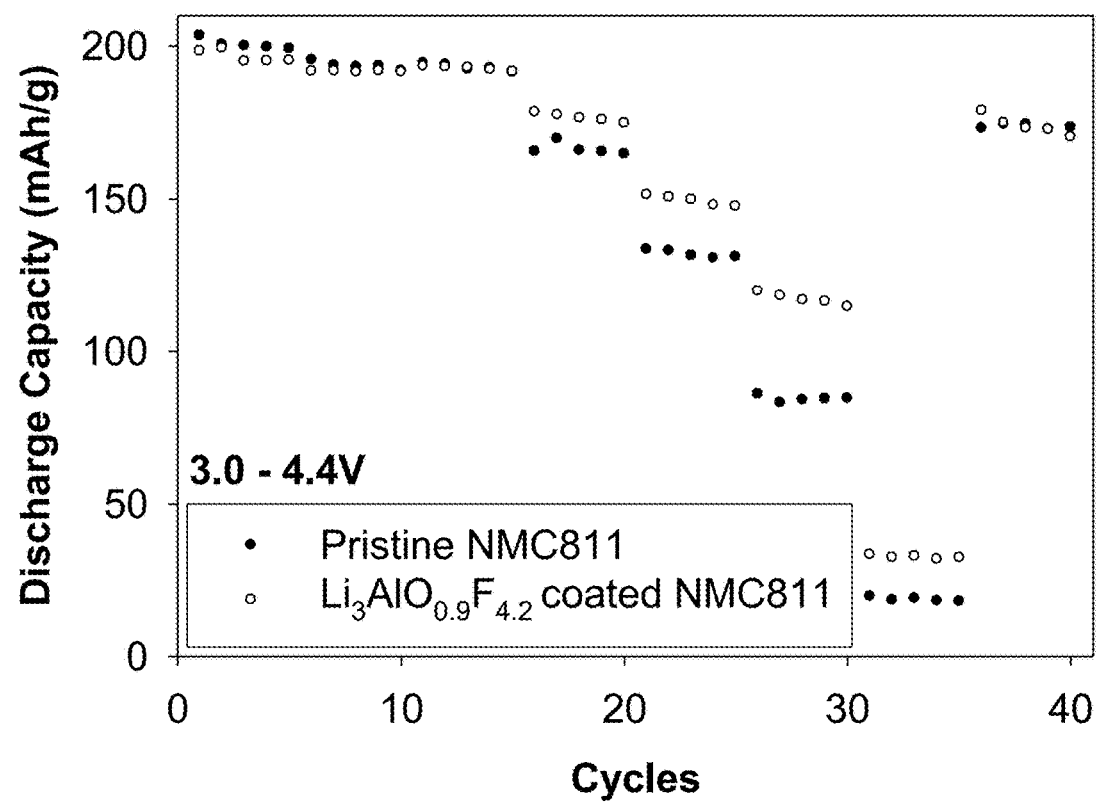
Fig. 11  Battery cycling test result for LiNi$_{0.8}$Mn$_{0.1}$Co$_{0.1}$O$_2$ cathode material coated by Li$_3$AlO$_{0.9}$F$_{4.2}$ shell (Al-F:Al-O = 70:30 mol/mol)

Fig. 12 Battery cycling test result for LiNi$_{0.8}$Co$_{0.15}$Al$_{0.05}$O$_2$ cathode material coated by Li$_3$AlO$_{2.1}$F$_{1.8}$ (Al-F:Al-O = 30:70 mol/mol) through aqueous solution coating method
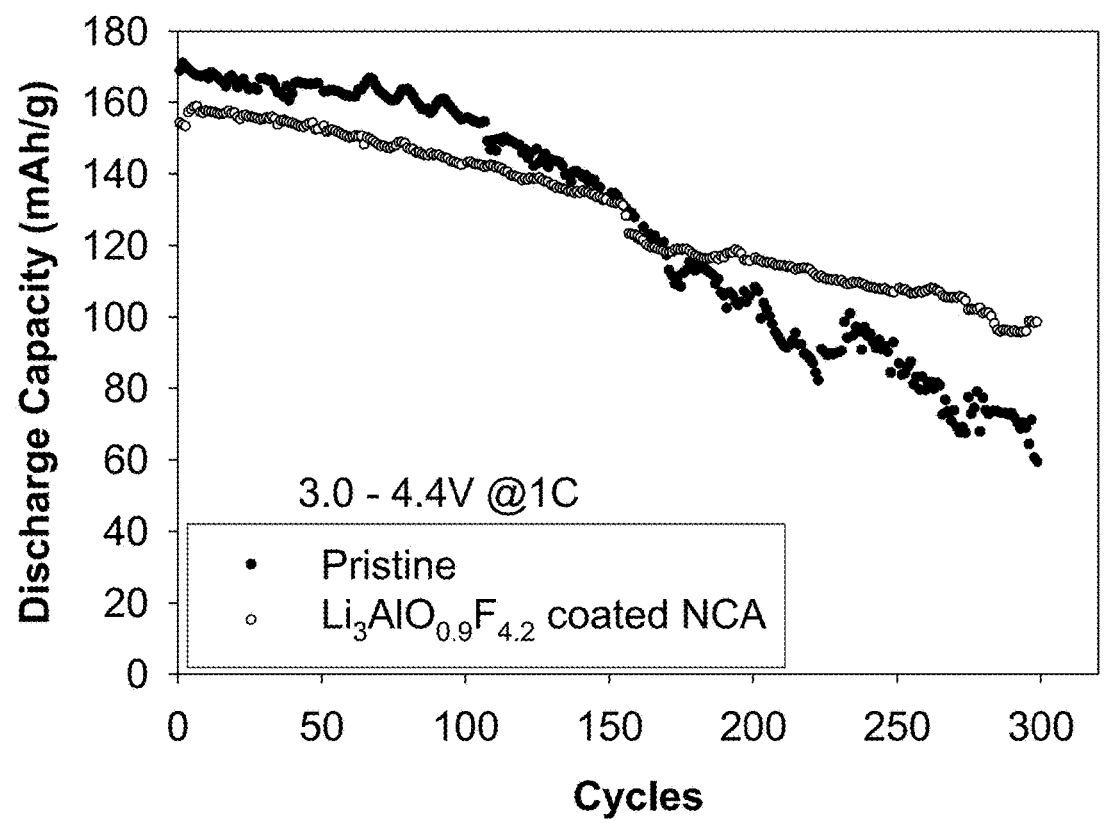

Fig. 13    Battery cycling test result for LiNi$_{0.8}$Co$_{0.15}$Al$_{0.05}$O$_2$ cathode material coated by Li$_3$AlO$_{2.1}$F$_{1.8}$ (Al-F:Al-O = 30:70 mol/mol) through solvent solution coating method
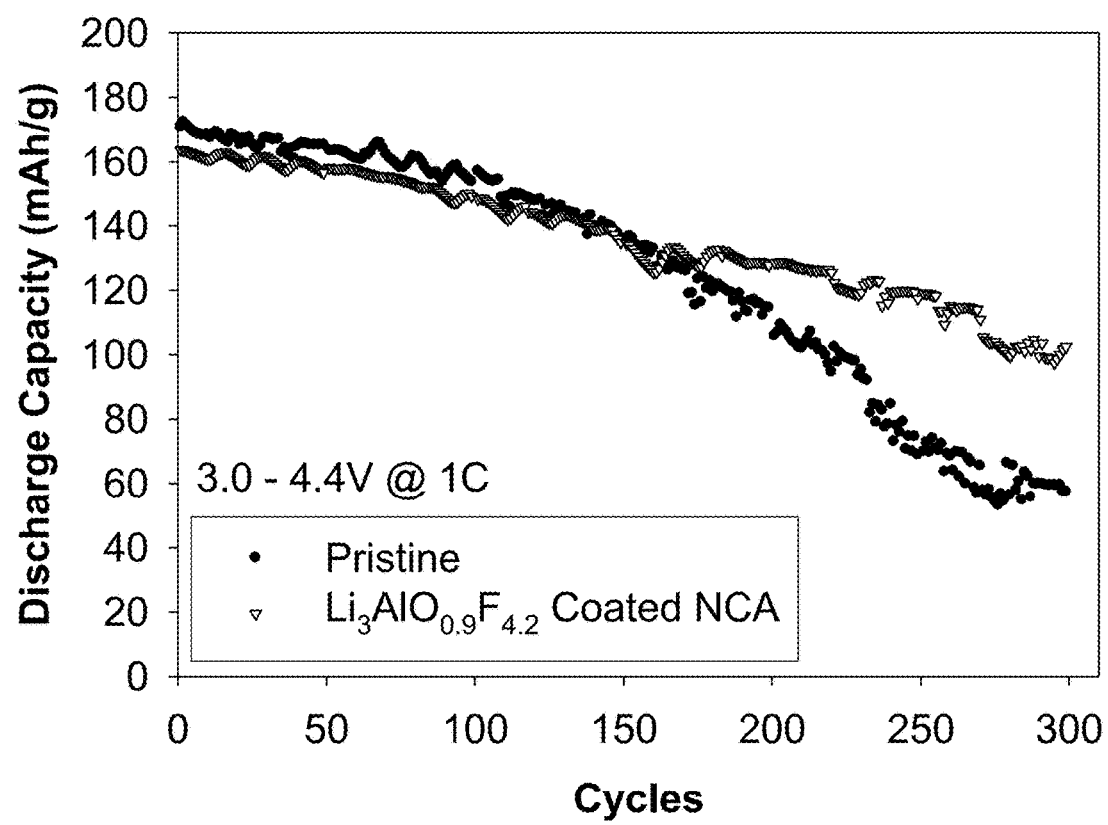

Fig. 14    Voltage and capacity relationship for pristine LCO and coated LCO
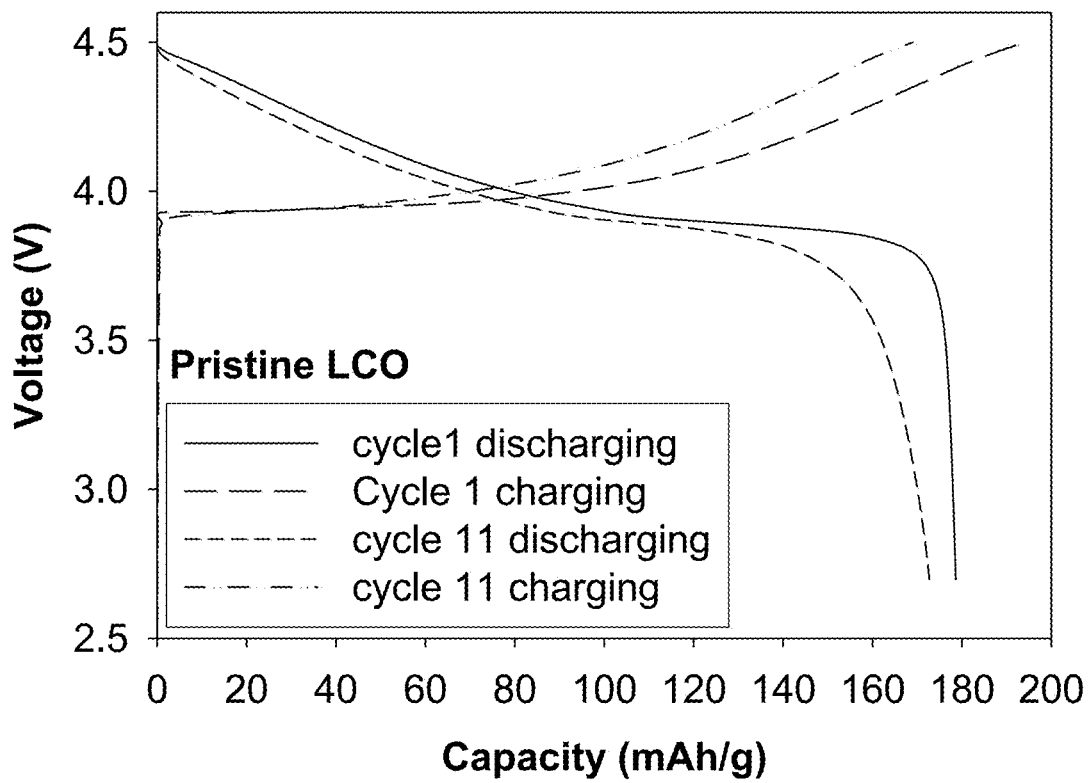
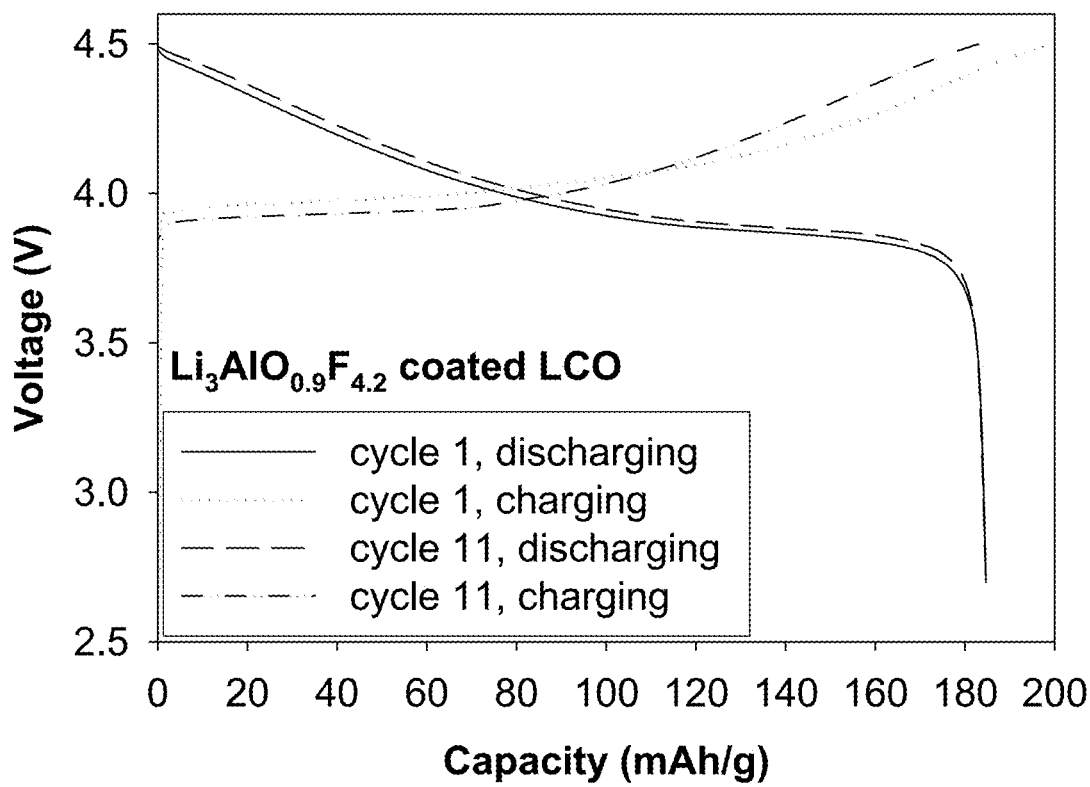

LIMMOXFY SHELL FORMATION ON CATHODE CERAMIC PARTICLE FOR LI ION BATTERY THROUGH ONIUM METAL OXIDE FLUORIDE PRECURSOR

The present application is a U.S. National Stage Application based on and claiming benefit and priority under 35 U.S.C. § 371 of International Application No. PCT/US2018/065099, filed 12 Dec. 2018, which in turn claims benefit under 35 U.S.C. § 119 to U.S. Provisional Application No. 62/611,705, filed 29 Dec. 2017, the entirety of both of which is hereby incorporated herein by reference.

TECHNICAL FIELD

The present invention relates to coatings for cathode ceramic particles, more specifically to lithium-containing coatings for ceramic particles used for lithium ion batteries, and most particularly to lithium metal oxide fluoride coatings for ceramic particles used for lithium ion batteries.

BACKGROUND

Lithium cathode ceramic materials, for example, lithium cobalt oxide (LCO), lithium nickel manganese cobalt oxide (NMC), and lithium nickel cobalt aluminum oxide (NCA) have excellent performance for energy storage. However, these materials also have various problems. For example, some materials suffer from one or more of gas generation, loss of stability of capacity, and runaway thermal events.

To overcome these and other drawbacks, core-shell structures have been used to improve the cycle life and safety of lithium ion battery cathode materials. The formation of an inert passivation shell on the active cathode ceramic particle surface can provide structural and thermal stability in highly delithiated states, thus the cycle life and safety can be improved. Various shell materials have been described for cathode ceramic particle surfaces, including active material shell, inert metal or non-metal oxide shell, and non-oxide salt shells. Many active shell materials have been investigated, for example, $BaTiO_3$ and lithium iron phosphate oxide shell, lithium iron phosphate oxide shell, gradient shell, and gradient $LiCoO_2$ shell. Various inert oxide shells, like $TiO_2$, $Al_2O_3$, $ZrO_2$, MgO, $SiO_2$, $B_2O_3$ and ZnO etc. have been investigated and used on ceramic particle surfaces. More recently, metal fluoride coatings and lithium fluorometallate coatings have been reported for use as the shell material for core-shell applications.

Various problems remain with all of the known coating materials. For example, active shell materials may use expensive starting materials and/or require complex calcination or other processing steps. For the inert oxide shells, the starting materials may use nitrate or sulfate salts, which result in low pH acidic coating solutions, which can result in dissolution of part of the core material during the coating process. Sol-gel processes may required complicated coating equipment and expensive starting materials. The coating processes used with the metal fluoride and lithium fluorometallate coatings require very high calcination temperatures and often result in non-uniform coatings on the core particles, due, e.g., to incomplete conversion of reactants or poor distribution of reactants on the core particle surfaces. Any coating that does not contain lithium does not provide additional lithium ion source to the battery system, thus limiting capacity improvements.

For all of the foregoing reasons, and others, there remains a strong need in the technologies relating to coating ceramic particles, including the ceramic particles used as the core material for lithium ion batteries, for improved materials for the shell materials and for improved methods of applying shell materials.

SUMMARY

The present invention addresses the above-mentioned and other related problems in these technologies, and provides significantly improved materials for the shell materials and improved methods for applying such shell materials.

To address the problems above, a method to form a shell having a general formula $Li_mMO_xF_y$ on the surface of ceramic substrates or ceramic particles, including active cathode ceramic particle surfaces, has been developed and is described in this disclosure. The newly developed inventive method prepares precursors having a general formula $Q_{m/n}MO_xF_y$ which are subsequently used in forming the new coating materials. Based on the disclosed precursor materials, shells comprising the general formula $Li_mMO_xF_y$ can be coated onto substrates, including ceramic particles, via solid blending methods, wet solution deposition methods, sol-gel methods, spray drying methods, and in particular, by heterogenous nucleation. The resulting core-shell structure, composed of a $Li_mMO_xF_y$ shell on, e.g., a cathode ceramic particle core, provides a novel, innovative core-shell structure. The preparation of the disclosed $Q_{m/n}MO_xF_y$ precursors provides a novel process to make a homogeneous coating material, especially as a result of the high solubility of the precursors in solution. The coating processes employing the disclosed precursor materials may use either or both aqueous and organic solvent systems. The coating process is applicable for many different ceramic materials, including particularly, cathode ceramic particle cores.

Thus, in one embodiment, the present invention provides a core-shell electrode active material, comprising:
a core capable of intercalating and deintercalating lithium; and
a coating layer formed on at least a portion of an outer surface of the core, wherein the coating layer comprises a lithium oxofluorometallate, wherein the lithium oxofluorometallate comprises a general formula:

$$Li_mMO_xF_y$$

wherein M is a metal capable of forming an oxofluorometallate, selected from aluminum (Al), iron (Fe), titanium (Ti), Zirconium (Zr), scandium (Sc), vanadium (V), chromium (Cr), manganese (Mn), cobalt (Co), nickel (Ni), copper (Cu), Zinc (Zn), molybdenum (Mo), ruthenium (Ru), lanthanum (La), Hafnium (Hf), Niobium (Nb), tungsten (W), gallium (Ga), indium (In), tin (Sn), thallium (Tl), and lead (Pb), and M may further comprise one or more additional metal, one or more metalloid, and one or more of phosphorus (P), sulfur (S), selenium (Se), iodine (I), or arsenic (As), or a combination of two or more of the additional metal, metalloid, P, S, Se, I, and As, and
$x>0$, $y>0$, $m \geq 1$ and $n \geq 1$.

In one embodiment, the core comprises one or a combination of two or more of lithium cobalt oxide, lithium manganese oxide, lithium nickel manganese oxide, lithium nickel manganese cobalt oxide (NMC), lithium nickel cobalt aluminum oxide, lithium-rich cathode material and nickel-rich NMC material.

In one embodiment, the metal capable of forming an oxofluorometallate is selected from Al, Ti, V, Zn, Ni, Co, Mn, Zr, In, Si, and Cu.

In one embodiment, M comprises a combination of two or more of the metals capable of forming oxofluorometallates.

In another embodiment, the present invention provides a process for coating a shell onto a ceramic substrate, comprising:

a. providing a ceramic substrate;
b. preparing a precursor having a general formula $Q_{m/n}MO_xF_y$ by the following reaction:

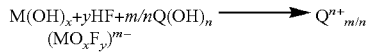

$$M(OH)_x + yHF + m/nQ(OH)_n \longrightarrow Q^{n+}_{m/n}(MO_xF_y)^{m-}$$

wherein

Q is an onium ion, selected from quaternary alkyl ammonium, quaternary alkyl phosphonium and trialkylsulfonium, wherein the alkyl groups are independently selected from $C_1$-$C_{18}$ alkyl, branched or unbranched;

M is a metal capable of forming an oxofluorometallate, selected from aluminum (Al), iron (Fe), titanium (Ti), Zirconium (Zr), scandium (Sc), vanadium (V), chromium (Cr), manganese (Mn), cobalt (Co), nickel (Ni), copper (Cu), Zinc (Zn), molybdenum (Mo), ruthenium (Ru), lanthanum (La), Hafnium (Hf), Niobium (Nb), tungsten (W), gallium (Ga), indium (In), tin (Sn), thallium (Tl), and lead (Pb), and may further comprise one or more additional metal, one or more metalloid, and one or more of phosphorus (P), sulfur (S), selenium (Se), iodine (I), or arsenic (As), or a combination of two or more of the additional metal, metalloid, P, S, Se, I, and As, and x>0, y>0, m≥1 and n≥1; and c. combining the $Q_{m/n}MO_xF_y$ precursor with a lithium ion source and with the ceramic substrate, and mixing to form a coating composition comprising a lithium oxofluorometallate having a general formula $Li_mMO_xF_y$ on the ceramic substrate.

In one embodiment, the process further comprises calcining the coated ceramic substrate at a temperature in the range from 200° C. to 700° C. for a time in the range from 1 to 24 hours.

In one embodiment, the ceramic substrate comprises ceramic particles suitable for active electrode material in a lithium-ion battery.

In one embodiment, the ceramic particles comprise one or a combination of two or more of lithium cobalt oxide, lithium manganese oxide, lithium nickel manganese oxide, lithium nickel manganese cobalt oxide (NMC), lithium nickel cobalt aluminum oxide, lithium-rich cathode material and nickel-rich NMC material.

In one embodiment, the metal capable of forming an oxofluorometallate is selected from Al, Ti, V, Zn, Ni, Co, Mn, Zr, In, Si, and Cu.

In one embodiment, M comprises a combination of two or more of the metals capable of forming oxofluorometallates.

In one embodiment, the quaternary ammonium is one or more selected from TMAH, 1,3-bis (trimethylammonium)-2-propanol dihydroxide (BTA(OH)$_2$), trimethyladmantylammonium hydroxide, and benzyltrimethylammonium hydroxide.

In one embodiment, the lithium ion source is one or more selected from lithium hydroxide, lithium acetate, or a lithium halide.

BRIEF DESCRIPTION OF THE DRAWINGS

FIG. 1 displays TOF-SIMS data from various coating samples in accordance with an embodiment of the invention.

FIG. 2 depicts the coating precursor conversion to shell vs. coating time, according to an embodiment of the invention.

FIGS. 3(*a*)-3(*g*) show SEM observations of the coating effect of a $Li_3AlO_xF_y$ shell on NMC622 core particles.

FIGS. 4(*a*) and 4(*b*) show SEM observations of the coated NMC622 particle morphology at greater magnifications.

FIGS. 5(*a*) and 5(*b*) show SEM observations of the coated NCA particle morphology at greater magnifications.

FIGS. 6(*a*) and 6(*b*) show SEM observations of the coated LCO particle morphology at greater magnifications.

FIGS. 7(*a*)-7(*e*) show SEM observations of the coated NMC622 particles by various coating materials using different coating methods.

FIG. 8 shows battery cycling test result for LCO cathode material coated by a $Li_3AlO_{0.9}F_{4.2}$ shell.

FIG. 9 shows battery cycling test results for LCO cathode material coated by a $Li_3Al_{0.3}In_{0.7}O_{0.9}F_{4.2}$ shell.

FIG. 10 exhibits battery cycling test results for $LiNi_{0.6}Mn_{0.2}Co_{0.2}O_2$.

FIG. 11 exhibits battery cycling test results for $LiNi_{0.8}Mn_{0.1}Co_{0.1}O_2$.

FIG. 12 exhibits battery cycling test results for $LiNi_{0.8}Co_{0.15}Al_{0.05}O_2$.

FIG. 13 exhibits battery cycling test results for $LiNi_{0.8}Co_{0.15}Al_{0.05}O_2$.

FIG. 14 shows the capacity and voltage relationship during charging and discharging for both pristine LCO material and coated LCO material.

The Figures are provided as non-limiting examples of embodiments of the present invention, and are intended to facilitate understanding of the present invention.

DETAILED DESCRIPTION

The invention described herein includes a method to prepare a precursor, and the precursor, which, when combined with a lithium ion source, forms a composition for coating particles and substrates with a lithium oxofluorometallate based on the precursor. Both the precursor and the lithium oxofluorometallate, in addition to at least one metal, may include additional metals, metalloids, and one or more of phosphorus (P), sulfur (S), and selenium (Se). The precursor has a general formula $Q_{m/n}MO_xF_y$, in which Q is a quaternary ammonium, quaternary phosphonium, or tertiary sulfonium or a mixture of any two or more of quaternary ammonium, quaternary phosphonium, and tertiary sulfonium, M is a metal selected from a specific group of metals, and M may further include one or more additional metal, one or more metalloid, phosphorus, sulfur, selenium or any combination of additional metals, metalloids, phosphorus, sulfur, and selenium, and in which x>0, y>0, m≥1 and n≥1. When the precursor is reacted with lithium ion, there is formed a lithium oxofluorometallate having a general formula $Li_mMO_xF_y$, in which the Q is replaced by Li in the general formula.

The specific group of metals M consists of metals capable of forming an oxofluorometallate, and includes aluminum (Al), titanium (Ti), Zirconium (Zr), scandium (Sc), vanadium (V), chromium (Cr), manganese (Mn), cobalt (Co), nickel (Ni), copper (Cu), Zinc (Zn), molybdenum (Mo), ruthenium (Ru), lanthanum (La), Hafnium (Hf), Niobium (Nb), tungsten (W), gallium (Ga), indium (In), tin (Sn), thallium (Tl), and lead (Pb). The additional metals include any of the foregoing metals capable of forming an oxofluorometallate and any other metal. The metalloids are boron (B), silicon (Si), germanium (Ge), arsenic (As), antimony (Sb), and tellurium (Te). In addition, both general formulae above may further include one or more of phosphorus (P), sulfur (S), selenium (Se), iodine (I), and arsenic (As).

The $Q_{m/n}MO_xF_y$ precursor can be prepared by reacting (a) at least one metal oxide or hydroxide, optionally one or more metalloid oxides or hydroxides, optionally one or more oxide of P, S or Se, (b) hydrofluoric acid and (c) onium hydroxides. The representative precursor general reaction formula is:

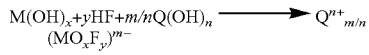

wherein:

Q is an onium-containing compound, selected from quaternary ammonium, quaternary phosphonium or tertiary sulfonium, or a combination thereof, in which optionally the onium-containing compound may be a multi-onium or a poly-onium cation;

M comprises at least one metal capable of forming an oxofluorometallate and, optionally, one or more additional metal, optionally one or more metalloid, optionally, one or more of P, S or Se, or any combination of the foregoing M; and x>0
y>0
m≥1
n≥1.

The actual values of x, y, m, and n depend upon the molar amounts of the onium-containing compound, the hydrofluoric acid and the metal oxide or hydroxide and the metalloid oxide or hydroxide, and the oxide of P, S or Se, used to form the precursor.

By using the above precursor, and combining the solution in which it is contained with a lithium ion source, the resulting ceramic particle coating compound is:

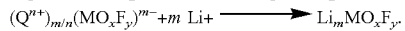

For example, when using aluminum hydroxide, hydrofluoric acid and tetramethylammonium hydroxide (TMAH), the precursor preparation reaction is:

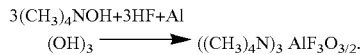

When using the precursor thus formed from Al(OH)$_3$, HF, and TMAH, and using lithium acetate as the source of lithium ion, the resulting ceramic particle coating compound is:

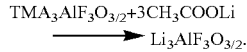

This insoluble coating compound is formed from the reaction of precursor and lithium compound (for example, lithium acetate) in solution and it deposits onto a core particle as it forms. The core particle may be a core particle material for lithium ion batteries. Thus, in this example, lithium oxofluoroaluminate forms a shell coating on the particles, as the reaction takes place between the lithium ion source and the quaternary ammonium, quaternary phosphonium, or tertiary sulfonium oxofluorometallate, and is deposited onto the surface of the particles by precipitation and/or heterogenous nucleation.

The relative amounts of O and F in the coating material markedly affects the coating properties, so the ratio must be defined specifically for each coating in accordance with the present invention. The M bonded with F is written as M-F, for example, metal Al bonded with F can be represented by Al—F. The M bonded with O is written as M-O, for example, metal Al bonded with O can be represented by Al—O. The fraction of M bonded with F (M-F) and the fraction of M bonded with O (M-O) can define the coating material composition. This means the molar ratio of M bonded with F (M-F) and M bonded with O (M-O) can define the coating material composition, of which we use M-F:M-O to represent this molar ratio. For this M-F:M-O molar ratio, its range can be from 1:99 to 99:1 mol/mol. Preferably, this ratio can be from 5:95 to 95:5 mol/mol, as verified by Al metal type coating materials. More preferably, this ratio can be from 30:70 mol/mol to 70:30 mol/mol. Even more preferably, this ratio is 70:30 mol/mol, in terms of precursor solution stability and coating process convenience. It is to be understood that, for convenience and simplicity, in the formulae in this disclosure, the stoichiometric quantity of the metal M (as defined herein) is set at a value of 1 (one), and the stoichiometric amounts of the other atoms, e.g., lithium, fluoride, oxygen and quaternary ammonium, quaternary phosphonium or tertiary sulfonium, are based on this stoichiometry for M to achieve a neutral molecule.

The concentration of the coating compound Li$_m$MO$_x$F$_y$, for example, Li$_3$AlF$_3$O$_{3/2}$, on the coated particle ranges from 0.001 wt % to about 30 wt % in terms of the total weight of the coated particle, after the coating has formed and the particle has been heated according to the process described herein. In one embodiment, the range is from about 0.32 wt % to about 4.5 wt % of the total weight of the coated particle. In another embodiment, the range is from 0.63 wt % to about 1 wt % of the total weight of the coated particle.

Suitable sources of the lithium ion include, for example, lithium acetate, lithium hydroxide, the lithium halides, e.g., fluoride, chloride, bromide and iodide.

The concentration of the precursor (quaternary ammonium, quaternary phosphonium or tertiary sulfonium types) in coating solution ranges from 0.001 wt % to about 30 wt % in terms of solvent weight. Preferably, the concentration of the precursor in coating solution ranges from 0.38 wt % to 5.44 wt %. Further preferably, the concentration of the precursor in coating solution ranges from 0.76 wt % to 1.27 wt %.

The step of allowing the Li$_m$MO$_x$F$_y$ coating composition to form a lithium oxofluorometallate coating on the ceramic particles or ceramic substrate is carried out by constant mixing for a time sufficient to deposit the coating on surfaces of the ceramic particles or ceramic substrate to form initially coated ceramic particles or ceramic substrate. The time for this formation is generally in the range of about 1 minute to about 24 hours, and in one embodiment is from about 0.5 hour to about 12 hours, and in one embodiment from about 1 hour to about 8 hours.

The actual method of mixing of course depends on the volume of material being treated. On a small scale, a simple laboratory shaker or stirrer can be used, whereas on a larger, e.g., preparative or industrial scale, appropriately heavier mechanical mixing devices may be employed, and these can be appropriately selected by persons of skill in the art.

When carrying out the coating, either water or an organic solvent may be used, so that the precursor Li$_m$MO$_x$F$_y$ may be mixed with a lithium salt in solvent in either an aqueous solution or an organic solvent solution. When the substrate particles, e.g., core material for a lithium ion battery, to be coated, are added into the solution and stirred for a sufficiently long period of time, an insoluble Li$_m$MO$_x$F$_y$ shell grows up slowly on the substrate particle surface.

Suitable organic solvents include alcohol type solvents, like methanol, ethanol, isopropanol, etc. Other solvents include, for example, tetrahydrofuran(THF), dioxane, dimethyl carbonate, dimethyl sulfoxide(DMSO), dimethylformamide (DMF), N-methyl-2-pyrrolidone (NMP). Preferably, the solvent is one which readily evaporates and can be recovered, rather than one which decomposes, when the product is heated during the heating step.

The coating mechanism is believed to be based upon reaction of the double layer of charges on the substrate or particle surface. Generally, the ceramic particles have a negatively charged particle surface with a double layer of negative charges surrounding the particle surface. In the layer closest to particle surface, the Li$^+$ concentration is much higher than in the bulk solution. Thus, the reaction to form Li$_m$MO$_x$F$_y$ preferably occurs on the particle surface, causing the Li$_m$MO$_x$F$_y$ shell to form on the surface of the ceramic particle or ceramic substrate. This reaction will continue until all precursor anions in solution are completely consumed.

Following the coating reaction, the Li$_m$MO$_x$F$_y$ coated ceramic particles are isolated, e.g., by centrifugation, and then heated at 200-700° C., preferably at 300-500° C., and most preferably, at 400° C., to complete the shell formation. The purpose of heating (which may also be referred to as calcination) is to turn the initial coating material (lithium metal fluoro oxide with hydrates) into lithium metal fluoro oxide by losing hydrate.

As disclosed herein, in one embodiment, M comprises a metal selected from a specific group of metals. In one embodiment, the specific group of metals M consists of metals capable of forming an oxofluorometallate, and includes aluminum (Al), titanium (Ti), zirconium (Zr), scandium (Sc), vanadium (V), chromium (Cr), manganese (Mn), cobalt (Co), nickel (Ni), copper (Cu), zinc (Zn), molybdenum (Mo), ruthenium (Ru), lanthanum (La), hafnium (Hf), niobium (Nb), tungsten (W), gallium (Ga), indium (In), tin (Sn), thallium (Tl), and lead (Pb). The additional metals include any of the foregoing metals capable of forming an oxofluorometallate and any other metal. The metalloids are boron (B), silicon (Si), germanium (Ge), arsenic (As), antimony (Sb), and tellurium (Te). In addition, both general formulae above may further include one or more of phosphorus (P), sulfur (S), selenium (Se), iodine (I), and arsenic (As).

In one embodiment, the metal M comprises one or a combination of two or more of Al, Ti, V, Zn, Ni, Co, Mn, Zr, In, Si, and Cu. In one embodiment, the metal M is one or a combination of two or more of Al, Ti, Zr and Mg. In one embodiment, one or a combination of two or more of Si, P, S, and B are included with the one or a combination of two or more of Al, Ti, V, Zn, Ni, Co, Mn, Zr, In, Si, and Cu. In one embodiment, the one or a combination of two or more of Si, P, S, and B are included with the one or a combination of two or more of Al, Ti, Zr and Mg.

In one embodiment, M comprises a combination of two or more of the metals capable of forming oxofluorometallates. These include, for example, an aluminum-titanium combination; an indium-titanium combination; an aluminum-zinc combination; an aluminum-titanium-zirconium combination; a titanium-zirconium combination; an aluminum-zirconium combination; a nickel-manganese combination; an aluminum-cobalt combination; an aluminum-manganese combination; an aluminum-lanthanum combination; and an aluminum-silicon combination. These are specific examples of preferred combinations, but this is not limiting, any combination of metals may be employed.

As disclosed herein, Q is an onium-containing compound, selected from quaternary ammonium, quaternary phosphonium or trialkylsulfonium, or a combination thereof, in which optionally the onium-containing compound may be a multi-onium or a poly-onium cation.

In one embodiment, Q is a quaternary ammonium ions and quaternary phosphonium ions are characterized by the formula (I):

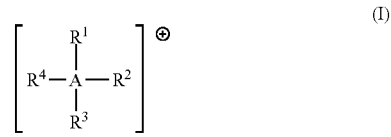

wherein in formula (I), A is a nitrogen or phosphorus atom, R$^1$, R$^2$, R$^3$ and R$^4$ are each independently, linear or branched alkyl groups containing from 1 to about 20, or 1 to about 10 carbon atoms, linear or branched hydroxyalkyl or alkoxyalkyl groups containing from 2 to about 20, or 2 to about 10 carbon atoms, substituted or unsubstituted aryl groups or hydroxyaryl groups containing from 6 to 18 ring carbon atoms, or R$^1$ and R$^2$ or R$^3$ together with A may form a heterocyclic group provided that if the heterocyclic group contains a C=A group, R$^3$ is the second bond. In the alkoxyalkyl groups, each of the alkyl portion and the alkoxy portion may contain from 1 to about 20 carbon atoms, linear or branched.

Specific examples of alkyl groups containing from 1 to 20 carbon atoms include methyl, ethyl, propyl, butyl, pentyl, hexyl, heptyl, octyl, isooctyl, nonyl, decyl, isodecyl, dodecyl, tridecyl, isotridecyl, hexadecyl and octadecyl groups. In one embodiment, R$^1$, R$^2$, R$^3$ and R$^4$ may be hydroxyalkyl groups containing from 2 to 5 carbon atoms such as hydroxyethyl and the various isomers of hydroxypropyl, hydroxybutyl, and hydroxypentyl. In one embodiment, R$^1$, R$^2$, R$^3$ and R$^4$ are independently alkyl and/or hydroxyalkyl groups containing 1 to about 5 carbon atoms. Specific examples of alkoxyalkyl groups include ethoxyethyl, butoxymethyl, butoxybutyl, etc. Examples of various aryl and hydroxyaryl groups include phenyl, benzyl, and equivalent groups wherein benzene rings have been substituted with one or more hydroxy groups. The aryl or hydroxyaryl groups may be substituted with, e.g., C$_1$-C$_{20}$ alkyl groups. Most often, R$^1$ to R$^4$ are lower alkyl, such as methyl.

Specific examples of quaternary ammonium ions include tetramethylammonium (TMA), tetraethylammonium (TEA), tetrapropylammonium, tetrabutylammonium (TBA), tetra-n-octylammonium, methyltriethylammonium, diethyldimethylammonium, methyltripropylammonium, methyltributylammonium, cetyltrimethylammonium, trimethylhydroxyethylammonium, trimethylmethoxyethylammonium, dimethyldihydroxyethylammonium, methyltrihydroxyethylammonium, phenyltrimethylammonium, phenyltriethylammonium, benzyltrimethylammonium, benzyltriethylammonium, dimethylpyrolidinium, dimethylpiperidinium, diisopropylimidazolinium, N-alkylpyridinium, etc. In one embodiment, the quaternary ammoniums used in accordance with this invention are TMA and TBA.

Examples of quaternary phosphoniums representative of Formula (I) wherein A=P which can be employed in accordance with the present invention include tetramethylphosphonium, tetraethylphosphonium, tetrapropylphosphonium, tetrabutylphosphonium, trimethylhydroxyethylphosphonium, dimethyldihydroxyethylphosphonium, methyltrihydroxyethylphosphonium, phenyltrimethylphosphonium, phenyltriethylphosphonium and benzyltrimethylphosphonium, etc.

In one embodiment, Q is a tetraalkylammonium hydroxide, as defined above. In one embodiment, the alkyl groups are each independently a $C_1$-$C_{18}$ alkyl group, or a $C_1$-$C_8$ alkyl group, or a $C_1$-$C_4$ alkyl group, any of which may be branched or unbranched. In general, the sizes of the alkyl groups are not considered to be critical, but the alkyl groups should not be so long as to impede solubility of the resulting precursor, in whichever of water, solvent or mixture of water and solvent that is employed. In one embodiment, the tetraalkylammonium polyoxoanion comprises tetramethylammonium hydroxide (TMAH). TMAH is normally the preferred quaternary ammonium compound, since it is readily available and is very soluble in aqueous compositions.

In another embodiment, the tertiary sulfonium ions are represented by the general formula II:

(II)

wherein in formula (II), $R^1$, $R^2$ and $R^3$ are each independently an alkyl group containing from 1 to about 20 carbon atoms, a hydroxyalkyl or an alkoxyalkyl group containing from 1 to about 20, substituted or unsubstituted aryl groups or hydroxyaryl groups containing from 6 to 18 ring carbon atoms. When substituted, the substitution comprises one or more substituent selected from any of the foregoing alkyl, hydroxyalkyl or alkoxyalkyl groups, or $R^1$ and $R^2$ or $R^3$ together with A may form a heterocyclic group provided that if the heterocyclic group contains a C=S group, $R^3$ is the second bond. In the alkoxyalkyl groups, each of the alkyl portion and the alkoxy portion may contain from 1 to about 20 carbon atoms.

In one embodiment, in Formula (II), the $R^1$, $R^2$ and $R^3$ may be any of the optional groups disclosed above with respect to the $R^1$-$R^4$ groups for the quaternary onium embodiments.

Examples of the tertiary sulfoniums represented by general formula II include trimethylsulfonium, triethylsulfonium, tripropylsulfonium, etc.

The quaternary ammonium, quaternary phosphonium, and tertiary sulfonium ions are provided for use in the present invention generally as the hydroxide, i.e., with —OH as the counterion, to balance the positive charge of the onium ion.

In another embodiment, Q is a molecule containing multi-onium cations and provided with multiple hydroxide anions. For example, multi quaternary ammonium cations with multi hydroxide anions in one molecule may be provided. The multi quaternary ammonium cations can include alkyl groups of any desired size, but in most embodiments, the alkyl groups are each independently a $C_1$-$C_{18}$ alkyl group, or a $C_1$-$C_8$ alkyl group, or a $C_1$-$C_4$ alkyl group, any of which may be branched or unbranched. In general, the sizes of the alkyl groups are not considered to be critical, but the alkyl groups should not be so long as to impede solubility of the resulting multi quaternary ammonium in the aqueous composition. The $C_1$-$C_{18}$ alkyl group can also contain one or more functional groups, like —OH or —COOH. The linkage chain between cations can be a $C_1$-$C_{18}$ alkyl group with or without functional groups, like —OH or —COOH. In one embodiment, the linkage chain is a $C_3$-$C_8$ alkyl chain with an —OH functional group on one or more of the internal linking carbon atoms.

In one embodiment, the multi quaternary ammonium cation with multi hydroxide comprises 1,3-bis (trimethylammonium)-2-propanol dihydroxide (BTA(OH)$_2$). BTA (OH)$_2$ is a preferred quaternary ammonium compound, since it is readily available and is very soluble in aqueous compositions.

Ceramic Powder

In one embodiment, the inorganic substrate comprises a ceramic oxide. In one embodiment, the ceramic oxide comprises Li+ions and is adapted for use in a lithium ion battery ceramic cathode material.

The ceramic powders included within the scope of this invention include, but are not limited to, lithium ion battery cathode ceramic materials. These ceramic powders are either commercially available products or may be prepared according to procedures found in literature and/or known to persons having ordinary skill in the art.

In one embodiment, the ceramic oxide may be, for example, one of the following:

lithium nickel manganese cobalt oxide, $LiNi_{0.33}Mn_{0.33}Co_{0.33}O_2$ lithium nickel cobalt aluminum oxide, $LiNi_{0.8}Co_{0.15}Al_{0.05}O_2$ lithium nickel cobalt aluminum oxide, $LiNi_{0.79}Co_{0.20}Al_{0.01}O_2$ lithium nickel cobalt oxide, $LiNi_{0.8}Co_{0.2}O_2$ lithium iron phosphate, $LiFePO_4$ lithium nickel oxide, $LiNiO_2$ lithium trivanadate, $LiV_3O_8$ manganese nickel carbonate; $Mn_{0.75}Ni_{0.25}CO_3$ copper vanadium oxide, $CuV_2O_6$ lithium cobalt phosphate, $LiCoPO_4$ lithium manganese dioxide, $LiMnO_2$ lithium manganese oxide, $LiMn_2O_4$ lithium manganese nickel oxide, $Li_2Mn_3NiO_8$ lithium iron oxide, $LiFeO_2$ lithium cobalt oxide, $LiCoO_2$ lithium molybdate, $LiMoO_4$ lithium titanate, $Li_2TiO_3$ lithium cobalt manganese oxide, $LiCo_{0.8}Mn_{0.2}O_2$ lithium nickel manganese oxide, $LiNi_{0.85}Mn_{0.15}O_2$ lithium cobalt nickel manganese oxide, $LiCo_{0.45}Ni_{0.45}Mn_{0.10}O_2$ lithium nickel manganese oxide, $LiNi_{0.8}Mn_{0.2}O_2$ lithium nickel cobalt boron oxide, $LiNi_{0.79}Co_{0.2}B_{0.01}O_2$ lithium nickel cobalt tin oxide, $LiNi_{0.79}Co_{0.2}Sn_{0.01}O_2$ lithium nickel cobalt aluminum oxide, $LiNi_{0.72}Co_{0.2}Al_{0.08}O_2$.

In one embodiment, the ceramic particles comprise one or a combination of two or more of lithium cobalt oxide, lithium manganese oxide, lithium nickel manganese oxide, lithium nickel manganese cobalt oxide (NMC), lithium nickel cobalt aluminum oxide, lithium-rich cathode material and nickel-rich NMC material.

In addition to ceramics, including the foregoing exemplary materials suitable for use as lithium-ion battery cathodes (the list is not all-inclusive of such materials), the inorganic substrate can be almost any inorganic material, including the ceramic materials and other inorganic materials such as silicon, glass, metals, dielectrics, and conductive materials. In one embodiment, the inorganic substrate comprises a semiconductor material. In one embodiment, the semiconductor material comprises a semiconductor wafer, in which optionally the semiconductor wafer comprises electronic circuitry.

EXAMPLES

Precursor Preparation (1) TMA Oxofluoroaluminate Precursor Solution Preparation

To a 2000 ml reactor with a stirrer, is charged 78 g (1 mol) Al(OH)$_3$ powder and 264.96 g DI-water. The mixture is stirred to form a slurry. To this slurry is slowly added 171.51 g (4.2 mol) of 49% wt HF solution. The reaction mixture gradually becomes a clear and transparent solution, and a large amount of heat is released. Then, 1068.16 g (3 mol) of 25.6% wt tetramethylammonium hydroxide (TMAH) is introduced into the clear and transparent solution by a slow addition. The resulting solution is filtered through a 0.2 μm filter. The resulting 1582.63 g precursor solution is a clear solution with a chemical formula (TMA)$_3$AlO$_{0.9}$F$_{4.2}$ and a concentration of 6.32×10$^{-4}$ mol Al/g/solution.

It is noted that, in this and other examples, the stoichiometry is an average, based on the total M (here, Al only) being 1, and the F and O contents varying by the relative contents of the M, (here, AlF$_3$ and Al(OH)$_3$). Other precursor (TMA)$_3$AlO$_x$F$_y$ solutions having different stoichiometry can be prepared simply by adjusting the ratio of M oxide or hydroxide to HF. The stoichiometry of the precursor (TMA)$_3$AlO$_{0.9}$F$_{4.2}$ results from, on a formulaic level, what amounts to a mixture containing a ratio of Al—F:Al—O=70:30. This does not mean that the precursor (TMA)$_3$AlO$_{0.9}$F$_{4.2}$ results from making a mixture of that ratio of AlF$_3$ and Al$_2$O$_3$, but is intended to simply show, on a conceptual basis, whence comes the stoichiometry of the (TMA)$_3$AlO$_{0.9}$F$_{4.2}$. For example, precursors having a Al—F:Al—O molar ratio of 5:95, 30:70, 50:50, 70:30, 85:15 and 95:5 have been prepared.

The as-prepared precursor solution is ready for use in a particle coating process, as described below.

(2) BTA Fluoroindiumate Precursor Solution Preparation

To a 100 ml bottle with a stirrer, is added 1.66 g (0.01 mol) In(OH)$_3$ powder and 27.35 g DI-water. The mixture is stirred to form a slurry. To this slurry is slowly added 2.45 g (0.03 mol) of 49% wt HF solution. The resulting mixture gradually turns into a clear and transparent solution with a large amount of heat being generated. Then, 18.34 g (0.015 mol) of 17.2% wt 1,3-bis (trimethylammonium)-2-propanol dihydroxide (BTA(OH)$_2$) is introduced into the above clear and transparent solution by slow addition. A clear transparent solution is formed and filtered through a 0.2 μm filter. The resulting BTA fluoroindiumate precursor solution as prepared has a concentration of 2×10$^{-4}$ mol In/g solution.

(3) TMA Aluminate Precursor Preparation

To a 4 L reactor with a stirrer, is added 80.08 g (2.97 mol) of 99.999% wt Al metal and 3170.67 g (8.91 mol) of 25.6% wt TMAH. The mixture is heated to 70° C. with stirring, and the reaction is carried out for 2 days until the Al metal completely disappears. The resulting clear solution is filtered through a 0.2 μm filter, giving rise to a TMA aluminate precursor solution with a concentration of 3.12×10$^{-3}$ mol Al/g solution.

(4) TMA-BTA Oxofluoro(Aluminate and Indiumate) Precursor Solution Preparation

To a 50 ml bottle with a stirrer, is charged 36.3 g of the above BTA fluoroindiumate. To this solution is added 3.42 g of the above TMA aluminate solution with vigorous stirring. A clear solution is formed with an In:Al molar ratio=7:3 mol/mol. The as-prepared precursor solution is ready for use for the disclosed coating process.

(5) BTA Titanate Precursor Preparation

To a 50 ml bottle with stirrer, is charged 10.76 g of 17.2% wt BTA(OH)$_2$. To such solution, is added 5.0 g titanium isopropoxide by dropwise addition under vigorous stirring. A clear solution is formed with a concentration of 1.116× 10$^{-3}$ mol Ti/g solution.

(6) BTA Fluorozirconate Precursor Preparation

To a 100 ml bottle with stirrer, 5 g zirconium sulfate tetrahydrate and 20 g DI-water are added. To the resulting clear solution is added 34.4 g of 17.2% wt BTA(OH)$_2$ drop by drop. A white precipitate of zirconium hydroxide is formed and is isolated by centrifuge. To 2.24 g of the zirconium hydroxide is added 3.45 g of 49% wt HF aqueous solution. A clear solution forms with a large amount of heat generated. To this solution, is introduced 17.2 g of 17.2% wt BTA(OH)$_2$ to afford a clear solution of BTA fluorozirconate with a concentration of 3.129×10$^{-4}$ mol Zr/g solution.

(7) BTA-TMA Oxofluoro(Titanate and Zirconate) Precursor Preparation

To a 20 ml bottle, are added 0.5 g of the above BTA titanate and 0.5 g of the above BTA fluorozirconate. Then, 5.0 g DI-water and 2.0 g of 35.37% wt TMAH are introduced to afford a clear solution of BTA-TMA oxofluoro (titanate/zirconate) in aqueous solution having a concentration of 9.21×10$^{-5}$ mol total metal/g solution at a ratio of Ti:Zr=3.7:1 mol/mol.

(8) Trimethyladmantylammonium Aluminate Preparation

To a 500 ml bottle with a stirrer, are charged 3.0 g Al metal (3 mm×6 mm) and 284.53 g of 24.76% wt trimethyladmantylammonium hydroxide. Under stirring, the mixture is heated to 70° C. and the reaction continued for 4 days until all of the Al metal dissolves into the solution. The resulting trimethyladmantylammonium aluminate solution has a concentration of 3.86×10$^{-4}$ mol Al/g solution (9) Benzyltrimethylammonium Silicate Preparation To a 500 ml bottle with a stirrer, are charged 10.0 g silica, 141.45 g of 19.68% wt benzyltrimethylammonium hydroxide and 130.47 g DI-water. Under stirring, the mixture is heated to 60° C. and the reaction continued for 2 days until all the silica dissolves into the solution, resulting in a benzyltrimethylammonium silicate solution with a concentration of 5.90×10$^{-4}$ mol Si/g solution.

Ceramic Coating Examples

The coating procedure is exemplified by the below representative examples. It is noted that, for simplicity, the Examples do not include details on steps such as mixing, washing, drying and other routine steps known to those skilled in the art. To summarize the following Examples:

Examples 1-6 apply a Li$_m$AlO$_x$F$_y$ shell on NMC622 core particles with Al—F:Al—O molar ratios of 5:95; 30:70; 50:50; 70:30; 85:15; 95:5, respectively, by an aqueous solution coating method.

Examples 7, 8 and 9 apply a Li$_m$AlO$_x$F$_y$ shell on LCO, NMC811 and NCA core particles, respectively, by an aqueous solution coating method.

Examples 10 and 11 apply a Li$_3$Al$_{0.3}$In$_{0.7}$O$_{0.9}$F$_{4.2}$ shell on LCO and NMC622 core particles, respectively, by an aqueous solution coating method.

Examples 12 and 15 demonstrate solid blend coating, of which Example 12 is a two component blending of solid TMA$_3$AlO$_{0.9}$F$_{4.2}$ precursor having an Al—F:Al—O molar ratio of 70:30 and LCO core particles, while Example 15 is a three component blending of TMA$_3$AlO$_3$ solid precursor, TMA$_3$AlF$_6$ solid precursor and NMC622 core particles.

Example 13 applies a Li$_2$Ti$_{0.93}$Zr$_{0.07}$O$_{2.79}$F$_{0.42}$ shell on NMC622 core particles by an aqueous solution coating method.

Example 14 applies a $Li_mAlO_xF_y$ shell on NMC622 core particles, having a Al—F:Al—O molar ratio of 70:30, by a solvent solution coating method.

Example 16 applies a multi metal precursor shell ($Li_m$ $AlTiZrSiO_xF_y$) shell on NMC622 core particles by a sol-gel coating method.

Example 1

Aqueous solution coating to prepare core-shell structure of lithium nickel manganese cobalt oxide $LiNi_{0.6}Mn_{0.2}Co_{0.2}O_2$ with lithium oxofluoroaluminate shell (Al—F:Al—O molar ratio of 5:95)

To a 50 ml plastic bottle, is added 0.7125 g of $8.831 \times 10^{-4}$ mol Al/g TMA oxofluoroaluminate precursor (Al—F:Al—O molar ratio of 5:95) and 20 g DI-water. Then 1.2584 g of 1.5 mmol/g lithium acetate is added to afford a clear transparent coating solution. To this solution is added 10 g of $LiNi_{0.6}Mn_{0.2}Co_{0.2}O_2$. This mixture is shaken vigorously for 1 day. Then the ceramic powder is isolated by centrifuge. The collected ceramic powder is placed in an oven and heated at 300° C. for 12 hours, giving the core-shell structure ceramic powder.

Example 2

Aqueous solution coating to prepare core-shell structure of lithium nickel manganese cobalt oxide $LiNi_{0.6}Mn_{0.2}Co_{0.2}O_2$ with lithium oxofluoroaluminate shell (Al—F:Al—O molar ratio 30:70)

To a 250 ml plastic bottle, are added 4.289 g of $7.335 \times 10^{-4}$ mol Al/g TMA oxofluoroaluminate precursor (Al—F:Al—O molar ratio 30:70) and 100 g DI-water.

Then 6.2893 g of 1.5 mmol/g lithium acetate is added to afford a clear transparent coating solution. To this solution is added 50 g of $LiNi_{0.6}Mn_{0.2}Co_{0.2}O_2$. This mixture is shaken vigorously for 1 day. Then the ceramic powder is isolated by centrifuge. The collected ceramic powder is placed in an oven and heated at 300° C. for 12 hours, giving the core-shell structure ceramic powder.

Example 3

Aqueous solution coating to prepare core-shell structure of lithium nickel manganese cobalt oxide $LiNi_{0.6}Mn_{0.2}Co_{0.2}O_2$ with lithium oxofluoroaluminate shell (Al—F:Al—O molar ratio 50:50)

To a 50 ml plastic bottle, are added 0.7945 g of $7.919 \times 10^{-4}$ mol Al/g TMA oxofluoroaluminate precursor (Al—F:Al—O molar ratio 50:50) and 40 g DI-water. Then 1.2584 g of 1.5 mmol/g lithium acetate is added to afford a clear transparent coating solution. To this solution is added 10 g of $LiNi_{0.6}Mn_{0.2}Co_{0.2}O_2$. This mixture is shaken vigorously for 1 day. Then the ceramic powder is isolated by centrifuge. The collected ceramic powder is placed in an oven and heated at 300° C. for 12 hours, giving the core-shell structure ceramic powder.

Example 4

Aqueous solution coating to prepare core-shell structure of lithium nickel manganese cobalt oxide $LiNi_{0.6}Mn_{0.2}Co_{0.2}O_2$ with lithium oxofluoroaluminate shell (Al—F:Al—O molar ratio 70:30)

To a 100 ml plastic bottle, are added 2.2656 g of $6.32 \times 10^{-4}$ mol Al/g TMA oxofluoroaluminate precursor and 40 g DI-water. Then, 2.888 g of 1.5 mmol/g lithium acetate is added to afford a clear transparent coating solution. To this solution is added 20 g of $LiNi_{0.6}Mn_{0.2}Co_{0.2}O_2$ ceramic particles. This mixture is shaken vigorously for 1 day. Then the ceramic powder is isolated by centrifuge. The collected ceramic powder is placed in an oven and heated at 400° C. for 5 hours, giving the core-shell structure ceramic powder.

Example 5

Aqueous solution coating to prepare core-shell structure of lithium nickel manganese cobalt oxide $LiNi_{0.6}Mn_{0.2}Co_{0.2}O_2$ with lithium oxofluoroaluminate shell (Al—F:Al—O molar ratio 85:15)

To a 250 ml plastic bottle, are added 5.64 g of $5.5578 \times 10^{-4}$ mol Al/g TMA oxofluoroaluminate precursor (Al—F:Al—O molar ratio 85:15) and 100 g DI-water. Then 6.2893 g of 1.5 mmol/g lithium acetate is added to afford a clear transparent coating solution. To this solution is added 50 g of $LiNi_{0.6}Mn_{0.2}Co_{0.2}O_2$. This mixture is shaken vigorously for 1 day. Then the ceramic powder is isolated by centrifuge. The collected ceramic powder is placed in an oven and heated at 400° C. for 5 hours, giving the core-shell structure ceramic powder.

Example 6

Aqueous solution coating to prepare core-shell structure of lithium nickel manganese cobalt oxide $LiNi_{0.6}Mn_{0.2}Co_{0.2}O_2$ with lithium oxofluoroaluminate shell (Al—F:Al—O molar ratio 95:5)

To a 50 ml plastic bottle, are added 0.8766 g of $7.178 \times 10^{-4}$ mol Al/g TMA oxofluoroaluminate precursor (Al—F:Al—O molar ratio 95:5) and 40 g DI-water.

Then 1.2584 g of 1.5 mmol/g lithium acetate is added to afford a clear transparent coating solution. To this solution is added 10 g of $LiNi_{0.6}Mn_{0.2}Co_{0.2}O_2$. The mixture is shaken vigorously for 1 day. Then the ceramic powder is isolated by centrifuge. The collected ceramic powder is placed in an oven and heated at 300° C. for 12 hours, giving the core-shell structure ceramic powder.

Example 7

Aqueous solution coating to prepare core-shell structure of lithium cobalt oxide $LiCoO_2$ with lithium oxofluoroaluminate shell (Al—F:Al—O molar ratio 70:30)

To a 100 ml plastic bottle, are added 2.5321 g of $6.32 \times 10^{-4}$ mol Al/g TMA oxofluoroaluminate precursor and 40 g DI-water. Then 2.972 g of 1.5 mmol/g lithium acetate is added to afford a clear transparent coating solution. To this solution is added 20 g of $LiCoO_2$ ceramic particles with an average crystal particle size of ~15 um. This mixture is shaken vigorously for 1 day. Then the ceramic powder is isolated by centrifuge. The collected ceramic powder is placed in an oven and heated at 400° C. for 5 hours, giving the core-shell structure ceramic powder.

Example 8

Aqueous solution coating to prepare core-shell structure of lithium nickel manganese cobalt oxide $LiNi_{0.8}Mn_{0.1}Co_{0.1}O_2$ with lithium oxofluoroaluminate shell (Al—F:Al—O molar ratio 70:30)

To a 100 ml plastic bottle, are added 1.853 g of $6.32 \times 10^{-4}$ mol Al/g TMA oxofluoroaluminate precursor and 40 g DI-water. Then 2.362 g of 1.5 mmol/g lithium acetate is added to afford a clear transparent coating solution. To this solution is added 20 g of $LiNi_{0.8}Mn_{0.1}Co_{0.1}O_2$ ceramic particles. This mixture is shaken vigorously for 1 day. Then the ceramic powder is isolated by centrifuge. The collected ceramic powder is placed in an oven and heated at 400° C. for 5 hours, giving the core-shell structure ceramic powder.

Example 9

Aqueous solution coating to prepare core-shell structure of lithium nickel cobalt aluminum oxide $LiNi_{0.8}Co_{0.15}Al_{0.05}O_2$ with lithium oxofluoroaluminate shell (Al—F:Al—O molar ratio 70:30)

To a 100 ml plastic bottle, are added 1.6098 g of 6.32× $10^{-4}$ mol Al/g TMA oxofluoroaluminate precursor and 40 g DI-water. Then 2.052 g of 1.5 mmol/g lithium acetate is added to afford a clear transparent coating solution. To this solution is added 20 g of $LiNi_{0.8}Co_{0.16}Al_{0.05}O_2$ ceramic particles. This mixture is shaken vigorously for 1 day. Then the ceramic powder is isolated by centrifuge. The collected ceramic powder is placed in an oven and heated at 700° C. for 3 s hours, giving the core-shell structure ceramic powder.

Example 10

Aqueous solution coating to prepare core-shell structure of lithium cobalt oxide $LiCoO_2$ with lithium oxofluoro (aluminate and indiumate) shell To a 100 ml plastic bottle, are added 3.9743 g TMA-BTA oxofluoro(aluminate and indiumate) precursor solution and 40 g DI-water. Then 2.0807 g of 1.5 mmol/g lithium acetate is added to afford a clear transparent coating solution. To this solution is added 20 g of $LiCoO_2$ ceramic particles with an average crystal particle size ~15 um. This mixture is shaken vigorously for 1 day. Then the ceramic powder is isolated by centrifuge. The collected ceramic powder is placed in an oven and heated at 400° C. for 5 hours, giving the core-shell structure ceramic powder.

Example 11

Aqueous solution coating to prepare core-shell structure of lithium nickel manganese cobalt oxide $LiNi_{0.6}Mn_{0.2}Co_{0.2}O_2$ with lithium oxofluoro(aluminate and indiumate) shell To a 100 ml plastic bottle, are added 5.5083 g TMA-BTA oxofluoro (aluminate and indiumate) precursor solution and 40 g DI-water. Then 2.888 g of 1.5 mmol/g lithium acetate is added to afford a clear transparent coating solution.

To this solution is added 20 g of $LiNi_{0.6}Mn_{0.2}Co_{0.2}O_2$ ceramic particles. This mixture is shaken vigorously for 1 day. Then the ceramic powder is isolated by centrifuge. The collected ceramic powder is placed in an oven and heated at 400° C. for 5 hours, giving the core-shell structure ceramic powder.

Example 12

Solid blending coating to prepare core-shell structure of lithium cobalt oxide $LiCoO_2$ with lithium oxofluoroaluminate shell To a mortar, are added 1.871 g lithium hydroxide monohydrate and 7.714 g of $1.93 \times 10^{-3}$ mol Al/g TMA oxofluoroaluminate precursor as dry powders. The materials are ground sufficiently to ensure a homogeneous mixing. Then, in another mortar, is loaded 20 g of $LiCoO_2$ ceramic particles and 0.9585 g of the precursor dry powder mixture. The ceramic particles and precursor are ground sufficiently to afford a homogeneous paste. The paste is placed in an oven and heated at 400° C. for 5 hours, giving the core-shell structure ceramic powder.

Example 13

Aqueous solution coating to prepare core-shell structure of lithium nickel manganese cobalt oxide $LiNi_{0.6}Mn_{0.2}Co_{0.2}O_2$ with lithium oxofluoro(titanate and zirconate) shell To a 50 ml plastic bottle, are added 2.28 g of the TMA-BTA oxofluoro(titanate and zirconate) precursor solution and 20 g DI-water. Then 0.280 g of 1.5 mmol/g lithium acetate is added to afford a clear transparent coating solution. To this solution is added 10 g of $LiNi_{0.6}Mn_{0.2}Co_{0.2}O_2$ ceramic particles. This mixture is shaken vigorously for 10 minutes, followed by addition of 0.133 g acetic acid under vigorous stirring. The mixture is shaken for 30 minutes and the ceramic powder is isolated by centrifuge. The collected ceramic powder is placed in an oven and heated at 300° C. for 12 hours, giving the core-shell structure ceramic powder.

Example 14

Solvent solution coating to prepare core-shell structure of lithium nickel manganese cobalt oxide $LiNi_{0.6}Mn_{0.2}Co_{0.2}O_2$ with lithium oxofluoroaluminate shell (Al—F:Al—O molar ratio 70:30)

To a 100 ml plastic bottle, are added 3.71 g TMA oxofluoroaluminate precursor solution and 20 g isopropanol. To this solution is added 50 g of $LiNi_{0.6}Mn_{0.2}Co_{0.2}O_2$ ceramic particles. Then 4.44 g of 1.5 mmol/g lithium acetate in 20 g isopropanol is added to this mixture. This mixture is shaken vigorously for 2 hours. Then the ceramic powder is isolated by centrifuge. The collected ceramic powder is placed in an oven and heated at 300° C. for 12 hours, giving the lithium oxofluoroaluminate coated core-shell structure ceramic powder.

Example 15

Solid blending coating to prepare core-shell structure of lithium nickel manganese cobalt oxide $LiNi_{0.6}Mn_{0.2}Co_{0.2}O_2$ with lithium oxofluoroaluminate shell A mortar is loaded with 10 g of $LiNi_{0.6}Mn_{0.2}Co_{0.2}O_2$ ceramic powder. To this ceramic powder are added 0.136 g lithium acetate dihydrate powder, 0.00299 g of 0.0743 mol Al/g TMA fluoroaluminate precursor powder and 0.00725 g of 0.0307 mol Al/g TMA aluminate precursor powder. Then, the ceramic powder and precursor powders are ground sufficiently to afford a blended powder. The blended powder is placed in an oven and heated at 300° C. for 12 hours, giving the lithium oxofluoroaluminate coated core-shell structure ceramic powder.

Example 16

Sol-gel coating to prepare core-shell structure of lithium nickel manganese cobalt oxide $LiNi_{0.6}Mn_{0.2}Co_{0.2}O_2$ with lithium oxofluoro(aluminate, titanate, zirconate, silicate) shell To a 10 ml bottle with magnetic stirrer, are charged 0.5 g BTA titanate, 0.5 g trimethyladmantylammonium aluminate, 0.5 g benzyltrimethylammonium silicate and 0.5 g BTA fluorozirconate. A clear solution is formed. Then, 1.0 g of 50% wt gluconic acid and 1.57 g of 1.5 mmol/g lithium acetate are added to this solution. Thus a clear and transparent sol is prepared. This clear and transparent sol can turn into a gel upon heating at 80° C. for 1 hour. To an alumina crucible is added 10 g of $LiNi_{0.6}Mn_{0.2}Co_{0.2}O_2$ ceramic powder. Then, ⅔ of the sol is introduced and sufficiently mixed with the ceramic powder, affording a diluted slurry. The slurry is heated at 80° C. for 1 hour, resulting in a gel. Then the temperature is elevated to 300° C. and kept for 12 hours to complete the calcination. Lithium oxofluoro(aluminate, titanate, zirconate, silicate) coated $LiNi_{0.6}Mn_{0.2}Co_{0.2}O_2$ is thus prepared.

Characterization

FIG. 1 displays time-of-flight secondary mass spectrometry (TOF-SIMS) data from various coating samples. In order to show the difference between the aforementioned coating process and a simple mixture of $LiAlO_x$ and $LiAlF_y$, several samples are generated and characterized using TOF-SIMS analysis. Five samples are tested: (1) pure $LiAlO_x$, (2) pure $LiAlF_y$, (3) a physical mixture of $LiAlO_x$ and $LiAlF_y$ that was ground together with a pestle and mortar, (4) the physical mixture after a calcination step, and (5) a sample of LCO coated with the aforementioned hybrid coating process. A representative example of the differences between the samples is included in FIG. 1. FIG. 1 shows the TOF-SIMS data for all 5 samples over the range of 34.93-35.03 atomic mass units (amu). Two peaks are present in this range. The taller peaks on the left side of the plot are from the chlorine signal. The smaller peaks on the right side, which are the peaks of interest in this discussion, are from O—F molecules.

TOF-SIMS is a non-destructive technique, so any species present in the data is present in the sample. The red pure '$LiAlO_x$' line has no O—F bonds because no fluorine is present in that sample. The green pure '$LiAlF_y$' line has some O—F bonds, which is most likely due to oxygen being absorbed from the air. The purple 'physical mixture' line has a larger amount of O—F bonds, which is likely due to greater air exposure caused by the increased in surface area brought on by the grinding process. The light blue 'calcined mixture' line has a similar magnitude to the previous two samples, meaning that no new O—F bonds were formed during calcination. Finally, the dark blue 'coated sample' line displays a marked increase in O—F peak height. One can therefore conclude that the novel coating process in no question leads to a greater amount of O—F bonds in the coating material than simply calcining a mixture of $LiAlO_x$ and $LiAlF_y$ would create. This shows a clear difference in the degree of coating homogeneity as well.

FIG. 2 depicts the coating precursor conversion to shell over a representative coating time. This graph indicates the coating process is effective to consume most precursor material and leave less precursor content in the processed solution. This is beneficial to the waste treatment of the solution used in the process.

FIGS. 3(a)-3(g) are SEM photomicrographs of the coating effect of a $Li_3AlO_xF_y$ shell on NMC622 core particles. FIG. 3(a) shows pristine NMC622 core particles; FIG. 3(b) shows the NMC622 core particles coated with Al—F:Al—O=5:95 mol/mol ($Li_3AlO_{2.85}F_{0.3}$); FIG. 3(c) shows the NMC622 core particles coated with Al—F:Al—O=30:70 mol/mol ($Li_3AlO_{2.1}F_{1.8}$); FIG. 3(d) shows the NMC622 core particles coated with Al—F:Al—O=50:50 mol/mol ($Li_3AlO_{1.5}F_{3.0}$); FIG. 3(e) shows the NMC622 core particles coated with Al—F:Al—O=70:30 mol/mol ($Li_3AlO_{0.9}F_{4.2}$); FIG. 3(f) shows the NMC622 core particles coated with Al—F:Al—O=85:15 mol/mol ($Li_3AlO_{0.45}F_{5.1}$); and FIG. 3(g) shows the NMC622 core particles coated with Al—F:Al—O=95:5 mol/mol ($Li_3AlO_{0.15}F_{5.7}$).

FIGS. 4(a) and 4(b) are SEM photomicrographs of the coated NMC622 particle morphology at greater magnifications. FIG. 4(a) shows the pristine NMC622 core particles, and FIG. 4(b) shows the NMC622 particles coated with $Li_3AlO_{0.9}F_{4.2}$ (Al—F:Al—O=70:30 mol/mol).

FIGS. 5(a) and 5(b) are SEM photomicrographs of the coated NCA particle morphology at greater magnifications. FIG. 5(a) shows the pristine NCA core particles, and FIG. 5(b) shows the NCA core particles coated with $Li_3AlO_{0.9}F_{4.2}$ (Al—F:Al—O=70:30 mol/mol).

FIGS. 6(a) and 6(b) are SEM photomicrographs of the coated LCO particle morphology at greater magnifications. FIG. 6(a) shows the pristine LCO core particles, and FIG. 6(b) shows the LCO core particles coated with $Li_3AlO_{0.9}F_{4.2}$ (Al—F:Al—O=70:30 mol/mol).

FIGS. 7(a)-7(e) are SEM photomicrographs of the coated NMC622 particles by various coating materials through different coating methods. FIG. 7(a) shows NMC622 core particles coated with $Li_3AlO_{2.1}F_{1.8}$ (Al—F:Al—O=30:70 mol/mol) from an aqueous solution process. FIG. 7(b) shows NMC622 core particles coated with $Li_2Ti_{0.93}Zr_{0.07}O_{2.79}F_{0.42}$ from an aqueous solution process. FIG. 7(c) shows NMC622 core particles coated with $Li_3AlO_{0.9}F_{4.2}$ (Al—F:Al—O=70:30 mol/mol) from a solvent solution process. FIG. 7(d) shows NMC622 core particles coated with $Li_3AlO_{1.5}F_3$ (Al—F:Al—O=50:50 mol/mol) from a solid blending process. FIG. 7(e) shows NMC622 core particles coated with $Li_{1.92}Ti_{0.47}Al_{0.16}Zr_{0.13}Si_{0.24}O_{2.49}F_{0.78}$ through a sol-gel process.

FIG. 8 exhibits battery cycling test results for LCO cathode material coated with $Li_3AlO_{0.9}F_{4.2}$. This LCO material is not known to be able to attain a voltage up to 4.5V in application. However, the coating of the present invention improved this material so that it can attain a voltage up to 4.5V in application. In addition, the cycling results indicate the coated LCO has excellent rate capacity performance and far higher capacity than the pristine material.

FIG. 9 exhibits battery cycling test results for LCO cathode material coated by a $Li_3Al_{0.3}In_{0.7}O_{0.9}F_{4.2}$ shell. The coating has greatly improved the LCO performance.

FIG. 10 exhibits battery cycling test results for $LiNi_{0.6}Mn_{0.2}Co_{0.2}O_2$. It can be observed that the coating can increase the battery capacity, especially capacity at high discharging current.

FIG. 11 exhibits battery cycling test results for $LiNi_{0.8}Mn_{0.1}Co_{0.1}O_2$. The coating has improved the rate capability of this high-Ni NMC material.

FIG. 12 exhibits battery cycling test results for $LiNi_{0.8}Co_{0.15}Al_{0.05}O_2$. The coating has improved the rate capability of the NCA material.

FIG. 13 exhibits battery cycling test results for $LiNi_{0.8}Co_{0.15}Al_{0.05}O_2$. The coating is applied using a solvent solution. The performance improvement caused by using a solvent solution coating method is better than that seen in an aqueous solution coating method for NCA material.

FIG. 14 exhibits the capacity and voltage relationship during the first and eleventh charging and discharging cycles for both pristine LCO material and coated LCO material. For the pristine LCO material, the impedance markedly increased after 11 cycles. However, for the coated material, the impedance does not show a significant change. This verifies that the coating has stabilized the battery performance.

It is noted that, although the present invention provides a thin layer of the lithium polyoxofluorometallate on the surface of the target substrate, since the layer deposited is so thin, the X-ray diffraction (XRD) pattern of the resulting material should not change substantially. If too heavy a layer of the oxide derived from the polyoxoanion is deposited on the surface of the target substrate, the XRD pattern may change, and this would reveal that the layer deposited is thicker than needed or desired. Thickness, and especially excess thickness, can be observed and estimated via SEM, by comparing SEM micrographs of the inorganic substrate taken before and after deposition of the oxide shell. See, e.g., FIGS. 3(a)-(d) and 4(a)-(d) and the descriptions thereof in the Examples above. For materials to be used as Li ion battery cathode materials, the layer of lithium polyoxofluorometallate on the surface of the ceramic material should be thin enough to allow passage of $Li^+$ ions during operation of the battery. If the layer is so thick that it inhibits free flow of the $Li^+$ ions, then it is too thick. In one embodiment, the thickness of the lithium polyoxofluorometallate on the surface of the target substrate is in the range from about 1 nm to about 20 nm, and in another embodiment, is in the range from about 2 nm to about 10 nm. The coating thickness may be less than 1 nm in some embodiments. Here, and elsewhere in the specification and claims of the present application, the limits of the ranges may be combined, and the ranges are all deemed to include intervening integral and fractional values. Thus, for example, although a thickness of 4 nm is not specifically mentioned, since this value falls within the disclosed range, it is included in the disclosure. Similarly, although a thickness of 3.5 nm is not specifically mentioned, it too is included in the disclosure.

To demonstrate that a significant change has been made to the surface of the particles coated in accordance with the present invention, the zeta potential of the uncoated and coated particles can be determined. When this is done with representative examples of the present invention, the zeta potential is changed significantly as shown in Table 1, below. Table 1 shows the zeta potential change of some core particles before and after coating. The zeta potential changed from higher negative zeta potential to lower zeta potential after coating for NCA, NMC622 and LCO materials, indicating the coating changed the material surface properties. Interestingly, the coating has brought the lower negative zeta potential to higher negative zeta potential for NMC811 material, indicating the coating changed the material surface properties. It is noted that this information is provided to demonstrate that the coating results in a measurable change in surface characteristics, and, although not to be bound by theory, is not believed to have particular significance for the functioning of the coated particles.

TABLE 1

| Cathode materials | $LiCoO_2$ | $LiNi_{0.6}Mn_{0.2}Co_{0.2}O_2$ | $LiNi_{0.8}Mn_{0.1}Co_{0.1}O_2$ | $LiNi_{0.8}Co_{0.15}Al_{0.05}O_2$ | $LiCoO_2$ |
|---|---|---|---|---|---|
| Coating materials | $Li_3AlO_{0.9}F_{4.2}$ | $Li_3AlO_{0.9}F_{4.2}$ | $Li_3AlO_{0.9}F_{4.2}$ | $Li_3Al_{0.9}F_{4.4}In_{0.7}O_{0.9}$ | $Li_3Al_{0.3}F_{4.2}$ |
| Pristine material zeta potential (mv) | −41 | −43 | −22 | −39 | −41 |
| Coated cathode material zeta potential (mv) | −26 | −27 | −35 | −20 | −31 |

It is noted that, throughout the specification and claims, the numerical limits of the disclosed ranges and ratios may be combined, and are deemed to include all intervening values. Furthermore, all numerical values are deemed to be preceded by the modifier "about", whether or not this term is specifically stated.

Furthermore, it should be appreciated that the process steps and structures described below do not form a complete process flow for manufacturing products such as lithium ion batteries or the uncoated core particles described herein. The present invention can be practiced in conjunction with fabrication techniques currently used in the art, and only so much of the commonly practiced process steps are included as are necessary for an understanding of the present invention.

While the principles of the invention have been explained in relation to certain particular embodiments, and are provided for purposes of illustration, it is to be understood that various modifications thereof will become apparent to those skilled in the art upon reading the specification. Therefore, it is to be understood that the invention disclosed herein is intended to cover such modifications as fall within the scope of the appended claims. The scope of the invention is limited only by the scope of the appended claims.

The invention claimed is:

1. A core-shell electrode active material, comprising:
   a core capable of intercalating and deintercalating lithium; and
   a coating layer formed on at least a portion of an outer surface of the core, wherein the coating layer comprises a lithium oxofluorometallate, wherein the lithium oxofluorometallate comprises a general formula:

$Li_mMO_xF_y$, wherein M is a metal capable of forming an oxofluorometallate, selected from aluminum (Al), iron (Fe), titanium (Ti), Zirconium (Zr), scandium (Sc), vanadium (V), chromium (Cr), manganese (Mn), cobalt (Co), nickel (Ni), copper (Cu), Zinc (Zn), molybdenum (Mo), ruthenium (Ru), lanthanum (La), Hafnium (Hf), Niobium (Nb), tungsten (W), gallium (Ga), indium (In), tin (Sn), thallium (Tl), and lead (Pb), and M may further comprise one or more additional metal, one or more metalloid, and one or more of phosphorus (P), sulfur (S), selenium (Se), iodine (I) or arsenic (As), or a combination of two or more of the additional metal, metalloid, P, S, Se, I, and As, and $x>0$, $y>0$, and $m \geq 1$, wherein for all metals M bonded to O and all metals M bonded to F in the coating, there is a ratio of M-F:M-O, and wherein the ratio of M-F:M-O is in the range from 30:70 to 70:30.

2. The core-shell electrode active material of claim 1 wherein the core comprises one or a combination of two or more of lithium cobalt oxide, lithium manganese oxide, lithium nickel manganese oxide, lithium nickel manganese cobalt oxide (NMC), lithium nickel cobalt aluminum oxide, lithium-rich cathode material and nickel-rich NMC material.

3. The core-shell electrode active material of claim 1 wherein the metal capable of forming an oxofluorometallate is selected from Al, Ti, V, Zn, Ni, Co, Mn, Zr, In, Si, and Cu.

4. The core-shell electrode active material of claim 1 wherein M comprises a combination of two or more of the metals capable of forming oxofluorometallates.

5. A process for coating a shell onto a ceramic substrate, wherein the ceramic substrate is a cathode material, comprising:
   a. providing a ceramic substrate;
   b. preparing a precursor having a general formula $Q_{m/n}MO_xF_y$ by the following reaction:

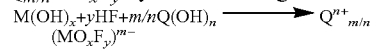

wherein
   Q is an onium ion, selected from quaternary alkyl ammonium, quaternary alkyl phosphonium and trialkylsulfonium, wherein the alkyl groups are independently selected from $C_1$-$C_{18}$ alkyl, branched or unbranched;
   M is a metal capable of forming an oxofluorometallate, selected from aluminum (Al), iron (Fe), titanium (Ti), Zirconium (Zr), scandium (Sc), vanadium (V), chromium (Cr), manganese (Mn), cobalt (Co), nickel (Ni), copper (Cu), Zinc (Zn), molybdenum (Mo), ruthenium (Ru), lanthanum (La), Hafnium (Hf), Niobium (Nb), tungsten (W), gallium (Ga), indium (In), tin (Sn), thallium (Tl), and lead (Pb), and may further comprise one or more additional metal, one or more metalloid, and one or more of phosphorus (P), sulfur (S), selenium (Se), iodine (I) or arsenic (As), or a combination of two or more of the additional metal, metalloid, P, S, Se, I, and As, and
   $x>0$, $y>0$, $m\geq1$ and $n\geq1$; and c. combining the $Q_{m/n}MO_xF_y$ precursor with a lithium ion source and with the ceramic substrate, and mixing to form a coating composition comprising a lithium oxofluorometallate having a general formula $Li_mMO_xF_y$ on the ceramic substrate.

6. The process of claim 5, further comprising calcining the coated ceramic substrate at a temperature in the range from 200° C. to 700° C. for a time in the range from 1 to 24 hours.

7. The process of claim 5, wherein the ceramic substrate comprises ceramic particles suitable for active electrode material in a lithium-ion battery.

8. The process of claim 7, wherein the ceramic particles comprise one or a combination of two or more of lithium cobalt oxide, lithium manganese oxide, lithium nickel manganese oxide, lithium nickel manganese cobalt oxide (NMC), lithium nickel cobalt aluminum oxide, lithium-rich cathode material and nickel-rich NMC material.

9. The process of claim 5 wherein the metal capable of forming an oxofluorometallate is selected from Al, Ti, V, Zn, Ni, Co, Mn, Zr, In, Si, and Cu.

10. The process of claim 5 wherein M comprises a combination of two or more of the metals capable of forming oxofluorometallates.

11. The process of claim 5 wherein the quaternary ammonium is one or more selected from tetramethylammonium hydroxide, 1,3-bis (trimethylammonium)-2-propanol dihydroxide (BTA(OH)2), trimethyladmantylammonium hydroxide, and benzyltrimethylammonium hydroxide.

12. The process of claim 5 wherein the lithium ion source is one or more selected from lithium hydroxide, lithium acetate, or a lithium halide.

* * * * *